United States Patent
Sumizawa et al.

(10) Patent No.: US 9,316,504 B2
(45) Date of Patent: Apr. 19, 2016

(54) NAVIGATION DEVICE AND GUIDANCE METHOD THEREOF

(75) Inventors: Akio Sumizawa, Kanagawa (JP); Satoshi Kurihara, Kanagawa (JP); Hideo Fujiwara, Kanagawa (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 13/519,484

(22) PCT Filed: Dec. 27, 2010

(86) PCT No.: PCT/JP2010/073614
§ 371 (c)(1),
(2), (4) Date: Oct. 12, 2012

(87) PCT Pub. No.: WO2011/081155
PCT Pub. Date: Jul. 7, 2011

(65) Prior Publication Data
US 2013/0030691 A1    Jan. 31, 2013

(30) Foreign Application Priority Data

Dec. 28, 2009 (JP) .................................. 2009-298082
Dec. 28, 2009 (JP) .................................. 2009-298083
Dec. 28, 2009 (JP) .................................. 2009-298084

(51) Int. Cl.
*G01C 21/34* (2006.01)
*G01C 21/36* (2006.01)
(Continued)

(52) U.S. Cl.
CPC ........ *G01C 21/3658* (2013.01); *G01C 21/3453* (2013.01); *G01C 21/3461* (2013.01); *G09B 29/106* (2013.01); *G01C 21/26* (2013.01); *G01C 21/34* (2013.01)

(58) Field of Classification Search
CPC .... G01C 21/26; G01C 21/34; G01C 21/3453; G01C 21/3461; G01C 21/3655; G01C 21/3658; G01G 1/09675; G01G 1/096838
USPC .......................................... 701/410; 704/410
See application file for complete search history.

(56) References Cited

U.S. PATENT DOCUMENTS 5,428,544 A *  6/1995  Shyu ............................ 701/117
5,487,002 A *  1/1996  Diller et al. ....................... 701/1
(Continued)

FOREIGN PATENT DOCUMENTS

JP     2000-131085 A    5/2000
JP     2001-183159 A    7/2001
(Continued)

OTHER PUBLICATIONS
Machine translation of Irie et al. WO2009/150784, Dec. 30, 2015.*
(Continued)

*Primary Examiner* — Fadey Jabr
*Assistant Examiner* — Kevin P Mahne
(74) *Attorney, Agent, or Firm* — Crowell & Moring LLP

(57) ABSTRACT

Disclosed is navigation technology for providing guidance for HOV lanes in a more readily understandable manner. A navigation device is provided with: a storage unit adapted to store lane information including the set-up of lanes which can be used when a predetermined condition is fulfilled (hereafter referred to as conditional lanes); a route guidance unit adapted to provide guidance for a recommended route to a destination; and a guidance unit adapted to provide guidance for entrances and exits for conditional lanes. If travelling along a conditional lane makes it impossible to continue without deviating from the recommended route, the guidance unit provides guidance that the conditional lane should not be entered from an entrance to the conditional lane or inhibits guidance on the presence of an entrance to the conditional lane.

5 Claims, 22 Drawing Sheets

(51) Int. Cl.
*G09B 29/10* (2006.01)
*G01C 21/26* (2006.01)

(56) References Cited

U.S. PATENT DOCUMENTS

| | | | | |
|---|---|---|---|---|
| 5,568,390 | A * | 10/1996 | Hirota et al. | 701/410 |
| 5,656,919 | A * | 8/1997 | Proctor et al. | 320/153 |
| 5,913,917 | A * | 6/1999 | Murphy | 701/123 |
| 6,085,147 | A * | 7/2000 | Myers | 701/528 |
| 6,212,468 | B1 * | 4/2001 | Nakayama et al. | 701/117 |
| 6,295,503 | B1 | 9/2001 | Inoue et al. | |
| 6,804,604 | B2 * | 10/2004 | Yamazaki | 701/428 |
| 7,979,201 | B2 * | 7/2011 | Machino | 701/413 |
| 8,050,859 | B2 * | 11/2011 | Machino | 701/415 |
| 8,068,982 | B2 * | 11/2011 | Takada | 701/417 |
| 8,086,404 | B2 * | 12/2011 | Asano | 701/437 |
| 8,174,570 | B2 * | 5/2012 | Yoneyama et al. | 348/135 |
| 8,290,701 | B2 * | 10/2012 | Mason et al. | 701/422 |
| 8,301,378 | B2 * | 10/2012 | Nishibashi et al. | 701/532 |
| 8,306,730 | B2 * | 11/2012 | Nishibashi et al. | 701/400 |
| 8,463,517 | B2 | 6/2013 | De Rinaldis et al. | |
| 8,467,962 | B2 * | 6/2013 | Irie et al. | 701/431 |
| 8,527,121 | B2 * | 9/2013 | Tate, Jr. | 701/22 |
| 2001/0021895 | A1 | 9/2001 | Yamazaki | 701/211 |
| 2005/0055158 | A1 * | 3/2005 | Machino | 701/209 |
| 2005/0159889 | A1 * | 7/2005 | Isaac | 701/210 |
| 2007/0050134 | A1 | 3/2007 | Hayashida et al. | |
| 2008/0114530 | A1 * | 5/2008 | Petrisor et al. | 701/117 |
| 2008/0208448 | A1 * | 8/2008 | Geelen et al. | 701/201 |
| 2008/0288163 | A1 | 11/2008 | Asano | |
| 2009/0125160 | A1 * | 5/2009 | Desai et al. | 701/1 |
| 2009/0248294 | A1 * | 10/2009 | Machino | 701/201 |
| 2009/0309974 | A1 * | 12/2009 | Agrawal et al. | 348/159 |
| 2010/0088024 | A1 * | 4/2010 | Takahara et al. | 701/208 |
| 2010/0094496 | A1 * | 4/2010 | Hershkovitz et al. | 701/22 |
| 2010/0138148 | A1 * | 6/2010 | Nishibashi et al. | 701/201 |
| 2010/0274473 | A1 * | 10/2010 | Konishi | 701/200 |
| 2010/0292916 | A1 * | 11/2010 | Kurciska et al. | 701/201 |
| 2011/0098919 | A1 * | 4/2011 | Irie et al. | 701/201 |
| 2011/0106420 | A1 * | 5/2011 | Nishibashi et al. | 701/200 |
| 2011/0166781 | A1 * | 7/2011 | Irie et al. | 701/201 |
| 2011/0231088 | A1 * | 9/2011 | Nishibashi et al. | 701/201 |
| 2011/0288760 | A1 * | 11/2011 | Nishibashi et al. | 701/200 |
| 2012/0072107 | A1 * | 3/2012 | Okude et al. | 701/416 |
| 2012/0109515 | A1 * | 5/2012 | Uyeki et al. | 701/423 |
| 2012/0245833 | A1 * | 9/2012 | Zaitsu et al. | 701/117 |
| 2013/0013189 | A1 * | 1/2013 | Nishibashi et al. | 701/411 |
| 2013/0030691 | A1 * | 1/2013 | Sumizawa et al. | 701/410 |
| 2013/0103304 | A1 * | 4/2013 | Nishibashi et al. | 701/410 |
| 2013/0110394 | A1 * | 5/2013 | Irie et al. | 701/461 |

FOREIGN PATENT DOCUMENTS

| | | | |
|---|---|---|---|
| JP | 2007-86052 A | 4/2007 | |
| JP | 2008-256593 A | 10/2008 | |
| JP | 2008-286671 A | 11/2008 | |
| JP | 2010-257086 A | 11/2010 | |
| JP | 2010-540316 A | 12/2010 | |
| WO | WO 2008117495 A1 * | 10/2008 | G01C 21/36 |
| WO | WO 2009/150784 * | 12/2009 | G01C 21/3658 |
| WO | WO 2009/150784 A1 | 12/2009 | |
| WO | WO 2010/061528 A1 | 6/2010 | |

OTHER PUBLICATIONS

International Search Report with English translation dated Apr. 5, 2011 (seven (7) pages).

Form PCT/ISA/237 (five (5) pages).

Japanese Office Action dated Mar. 18, 2014 with English translation (seven (7) pages).

* cited by examiner

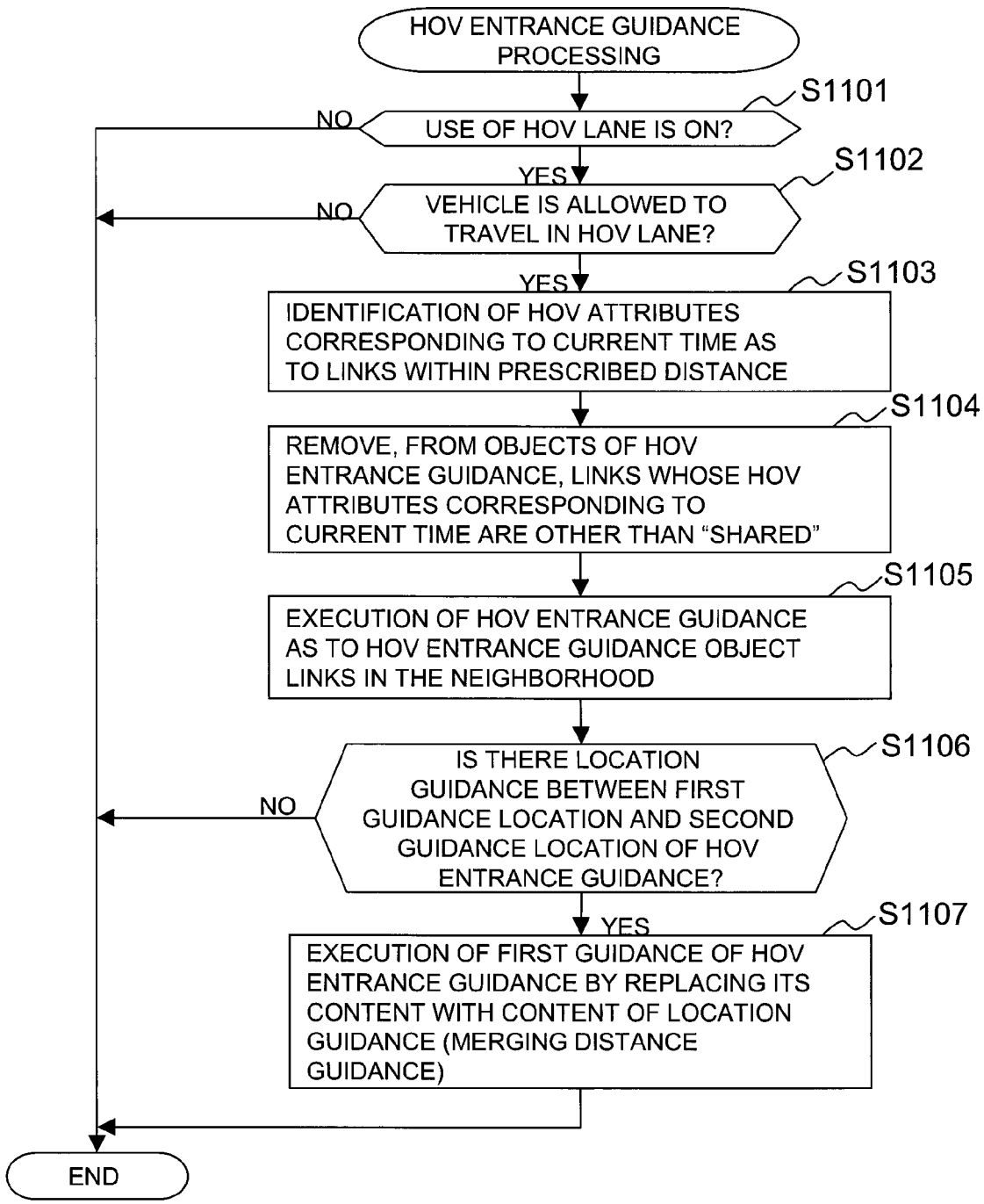

NAVIGATION DEVICE AND GUIDANCE METHOD THEREOF

TECHNICAL FIELD

The present invention relates to a technique for a navigation device. The present invention claims the priorities of Japanese Patent Application Nos. 2009-298082, 2009-298083 and 298084 all filed on Dec. 28, 2009, whose contents are incorporated herein by reference as for the designated countries that permit it.

BACKGROUND ART

Conventionally, a navigation device employs a route guidance technique adapted for a traffic lane (such as a High-Occupancy Vehicles (HOV) lane) in which vehicles satisfying specific conditions are allowed to travel. Patent Document 1 describes a technique for such a navigation device. Also, an HOV lane is called a carpool lane.

Patent Document 1: Japanese Unexamined Patent Laid-Open No. 2000-131085

DISCLOSURE OF THE INVENTION

A navigation device as described above, however, cannot necessarily perform adequate guidance into an HOV lane.

An object of the present invention is to perform guidance into an HOV lane in a more understandable manner.

To solve the above problem, the present invention provides a navigation device relating to a point (hereinafter, referred to as "first point of the invention") that suitable guidance is performed at an entrance/exit of a lane that is available for traveling when prescribed conditions are satisfied. Thus, the present invention provides a navigation device comprising: a storage unit adapted to store lane information including information on a state of setting-up of a lane (hereinafter, referred to as conditional lane) that is available for traveling when prescribed conditions are satisfied; a route guidance unit adapted to perform guidance along a recommended route to a destination; and a guidance unit adapted to perform guidance for an entrance/exit of the conditional lane; and the guidance unit adapted to perform guidance not to enter into the conditional lane or to inhibit guidance about existence of an entrance of the conditional lane, when traveling in the conditional lane makes it impossible to travel without deviating from the recommended route.

Further, the present invention provides a navigation device relating to a point (hereinafter, referred to as "second point of the invention") that guidance unsuitable for a user is inhibited. Thus, the present invention provides a navigation device comprising: a storage unit adapted to store, for each prescribed section of a road, lane information including information on a state of setting-up of a lane (hereinafter, referred to as conditional lane) that is available for traveling when prescribed conditions are satisfied; a current location identifying unit adapted to identify a current location; a judgment unit adapted to judge whether the current location identified by the current location identifying unit exists on a road that merges into the road set up with the conditional lane; and a driving guidance unit adapted to perform guidance for driving before a merging point into the road set up with the conditional lane; and when the judgment unit judges that the current location is on the road merging into the road set up with the conditional lane, the driving guidance unit adapted to perform guidance about a distance to the merging point if a situation allows use of the conditional lane, and to perform guidance about existence of the conditional lane if the situation does not allow use of the conditional lane.

Further, the present invention provides a navigation device relating to a point (hereinafter, referred to as "third point of the invention") that guidance unsuitable for a user traveling in a lane that is available for traveling when prescribed conditions are satisfied is inhibited, comprising: a judgment unit adapted to judge whether traveling is in a lane (hereinafter, referred to as conditional lane) that is available for traveling when prescribed conditions are satisfied; and a guidance unit adapted to perform guidance for traveling at a branch when the judgment unit judges before the branch that the traveling is not in the conditional lane, and to inhibit the guidance for traveling at the branch when the judgment unit judges before the branch that the traveling is in the conditional lane.

According to the present invention, it is possible to perform guidance about an HOV lane in an easy-to-understand manner.

BRIEF DESCRIPTION OF DRAWINGS

FIG. 17 is a flowchart showing HOV entrance guidance processing;

BEST MODE FOR CARRYING OUT THE INVENTION

Now, a navigation device to which an embodiment relating to the first point of the present invention is applied will be described referring to drawings.

Figure 1:
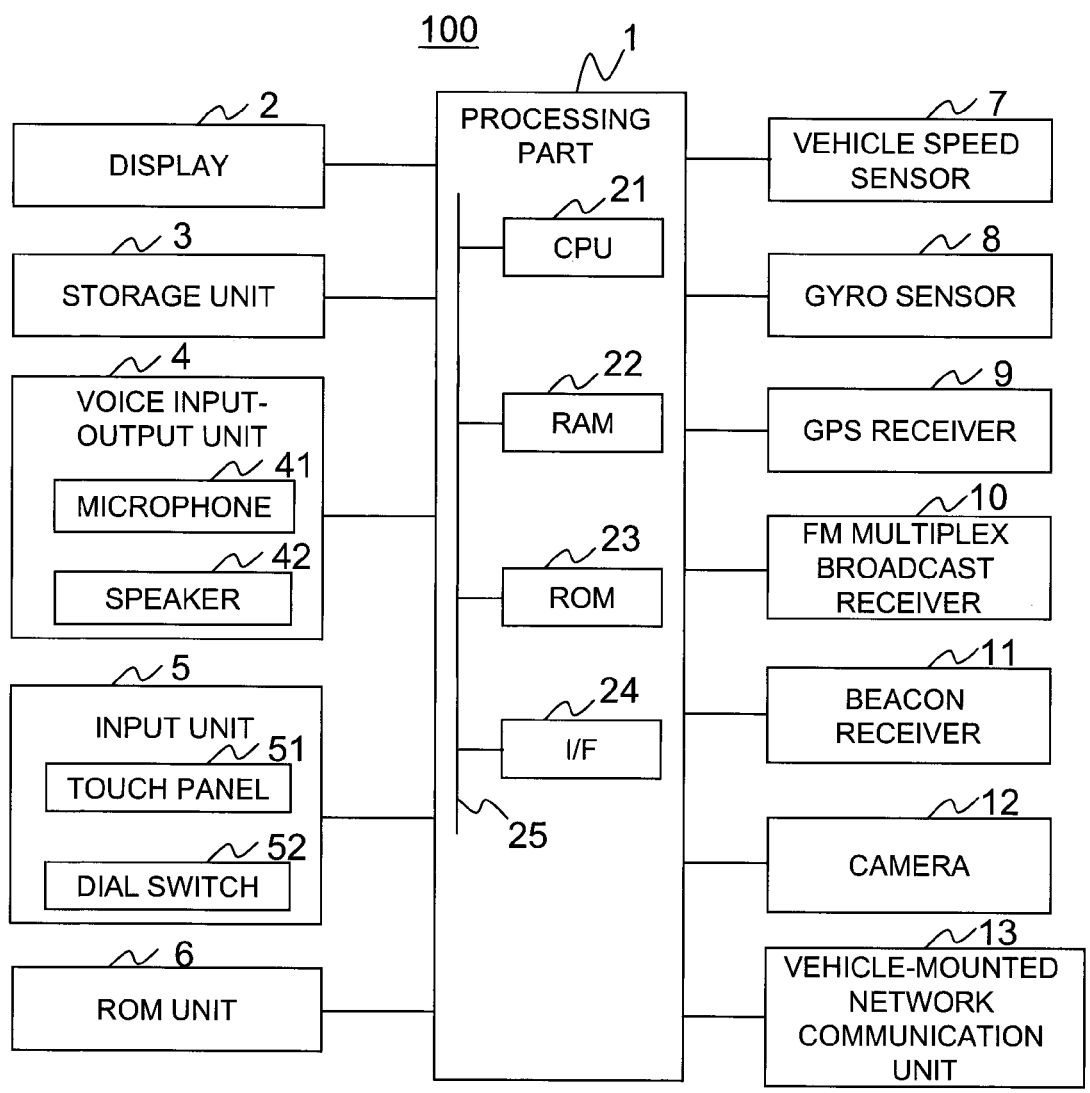
FIG. 1 is a schematic block diagram showing a navigation device.

FIG. 1 is a diagram showing a general configuration of a navigation device 100. As a so-called navigation device, the navigation device 100 can display map information to indicate a point denoting the current location of the navigation device 100 and information for guidance along a route to an already-set destination.

The navigation device 100 comprises a processing part 1, a display 2, a storage unit 3, a voice input-output unit 4 (having a microphone 41 as a voice input unit and a speaker 42 as a voice output unit), an input unit 5, a ROM unit 6, a vehicle speed sensor 7, a gyro sensor 8, a Global Positioning System (GPS) receiver 9, an FM multiplex broadcast receiver 10, a beacon receiver 11, a camera 12, and a vehicle-mounted network communication unit 13.

The processing part 1 is a central unit that performs various types of processing. For example, the processing part 1 calculates a current location on the basis of information outputted from the various types of sensors 7, 8, the GPS receiver 9, the FM multiplex broadcast receiver 10 and the like. Further, based on the obtained current location information, the processing part 1 reads out map data required for display from the storage unit 3 or the ROM unit 6.

Further, the processing part 1 expands the read map data into graphics, superimposes a mark denoting the current location on the graphics, and displays the resultant graphics on the display 2. Further, by using map data and the like stored in the storage unit 3 or the ROM unit 6, the processing part 1 searches for the optimum route (recommended route) connecting a departure place designated by the user or the current location to a destination (or a way point or a stopover point). Further, the processing part 1 guides the user by using the speaker 42 and/or the display 2.

Further, the processing part 1 can give guidance on driving at an entrance/exit of a High-Occupancy Vehicles (HOV) lane in the course of route guidance. An HOV lane is a lane for which it is prescribed that only a vehicle carrying at least a prescribed number of passengers (for example, two including a driver) or a vehicle satisfying specific criteria (such as fuel efficiency standards or low-pollution criteria) can travel in it.

The processing part 1 of the navigation device 100 is constructed by connecting component devices through a bus 25. The processing part 1 comprises: a Central Processing Unit (CPU) 21, which executes various types of processing such as numerical operation and control of each component device; a Random Access Memory (RAM) 22 for storing map data, operation data and the like read from the storage unit 3; a Read Only Memory (ROM) 23 for storing programs and data; and an interface (I/F) 24 for connecting various hardware units with the processing part 1.

The display 2 is a unit for displaying graphics information generated by the processing part 1 or the like. The display 2 comprises a liquid crystal display, an organic EL display, or the like.

The storage unit 3 comprises a storage medium that is at least readable-writable, such as a Hard Disk Drive (HDD), a nonvolatile memory card, or the like.

This storage medium stores a link table 200, i.e. map data (including link data on links as components of each road on a map) required for an ordinary route search device.

Figure 2:
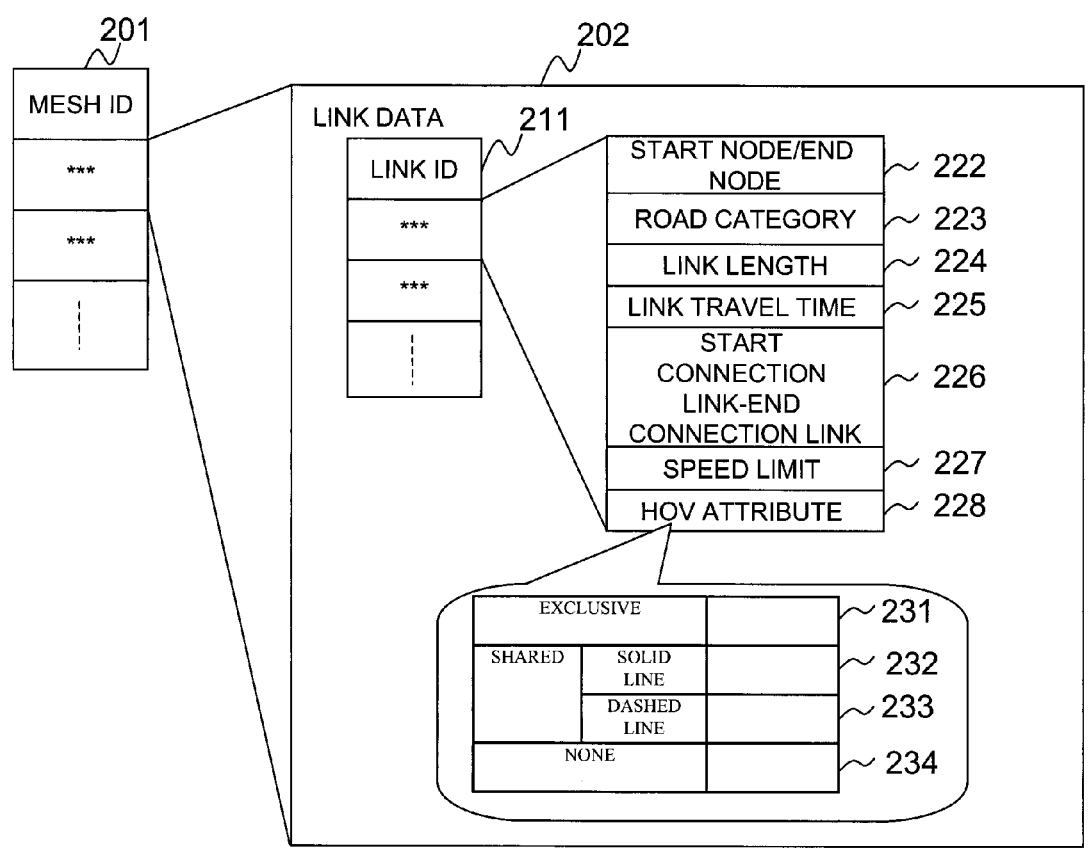
FIG. 2 is a diagram showing structure of a link table.

FIG. 2 is a diagram showing structure of the link table 200. For each identification code (a mesh ID) 201 of a mesh as a compartment area on a map, the link table 200 contains link data 202 for each of links constituting the roads included in the mesh area.

For each link ID 211 as an identifier of a link, the link data 202 includes: coordinate information 222 of two nodes (a start node and an end node) constituting the link; a road category 223, which indicates a category of the road including the link in question; a link length 224, which indicates the length of the link; a link travel time 225 stored previously; a start connection link-end connection link 226, which specifies a start connection link as a link connecting to the start node of the link in question and an end connection link as a link connecting to the end node of the link in question; a speed limit 227, which indicates a speed limit of the road including the link in question; an HOV attribute 228, which specifies an attribute concerning a state of setting-up of an HOV lane for the link; and the like.

As the HOV attribute 228, the link in question has a "exclusive" attribute 231 when the link consists of HOV lanes only: and a "none" attribute 234 when the link is a road that is not provided with an HOV lane. Further, when the link in question is a road having both an HOV lane and an ordinary lane and a lane change between an HOV lane and an ordinary lane is prohibited at that link, the link has a "shared-solid line" attribute 232. And, when the link in question is a road having both an HOV lane and an ordinary lane and a lane change between an HOV lane and an ordinary lane is permitted at that link, the link has a "shared-dashed line" attribute 233. Thus, it is said that the HOV attribute 228 stores information specifying a setting-up state of an HOV lane.

Here, the two nodes constituting a link are distinguished as a start node and an end node, so that the upbound direction and the downbound direction of the same road are managed as different links from each other.

Description will be given returning to FIG. 1. The voice input-output unit 4 comprises the microphone 41 as a voice input unit and the speaker 42 as a voice output unit. The microphone 41 obtains sound outside the navigation device 100, such as voice coming from the user or another passenger.

The speaker 42 outputs, as voice, a message that is generated for the user by the processing part 1. The microphone 41 and the speaker 42 are placed separately at predefined positions of a vehicle. However, they may be housed in an integral case. The navigation device 100 can be provided with a plurality of microphones 41 and/or a plurality of speakers 42.

The input unit 5 is a device for receiving an instruction from the user through operation of the user. The input unit 5 comprises a touch panel 51, a dial switch 52, a scroll key as another hard switch (not shown), a scale change key, and the like. Further, the input unit 5 includes a remote control that can remotely give an operating instruction to the navigation device 100. The remote control is provided with a dial switch, a scroll key, a scale change key and the like, and can send information on operation of each key or switch to the navigation device 100.

The touch panel 51 is mounted on the display surface side of the display 2, and it is possible to see the display screen through the touch panel 51. The touch panel 51 specifies a touched position in relation to the X-Y coordinate of an image displayed on the display 2, converts the position into a coordinate, and outputs the obtained coordinate. The touch panel 51 comprises pressure-sensitive type or electrostatic type input detection elements or the like.

The dial switch 52 is constructed so as to be rotatable clockwise and counterclockwise, generates a pulse signal for each rotation of a prescribed angle, and outputs the generated pulse signals to the processing part 1. The processing part 1 obtains the angle of rotation on the basis of the number of the pulse signals.

The ROM unit 6 comprises a storage medium that is at least readable such as a Read-Only Memory (ROM) (such as a CD-ROM or a DVD-ROM) or an Integrated Circuit (IC) card. Such a storage medium stores moving image data or voice data, for example.

The vehicle speed sensor 7, the gyro sensor 8 and the GPS receiver 9 are used for the navigation device 100 to detect the current location (i.e. the location of the vehicle itself). The vehicle speed sensor 7 is a sensor that outputs a value used for calculating the vehicle speed. The gyro sensor 8 comprises an optical-fiber gyroscope, a vibrational gyroscope, or the like, and detects an angular velocity due to turning of a moving body. The GPS receiver 9 receives signals from GPS satellites and measures a distance between a moving body and each GPS satellite and a rate of change of that distance with respect to three or more satellites, in order to measure the current location, the traveling speed and a traveling direction of the moving body.

The FM multiplex broadcast receiver 10 receives an FM multiplex broadcast signal sent from an FM broadcast station. As FM multiplex broadcast, general current-state traffic information, traffic regulation information, Service Area/Parking Area (SA/PA) information, parking lot information, weather information and the like of Vehicle Information Communication System (VICS, a registered trademark) information, and text information provided as FM multiplex general information from a radio station can be received.

The beacon receiver 11 receives general current-state traffic information, traffic regulation information, Service Area/Parking Area (SA/PA) information, parking lot information, weather information, emergency information and the like of, for example, VICS information. For example, an optical beacon receiver using light-wave communication or a radio beacon receiver using radio wave can be mentioned as the beacon receiver.

Figure 3:
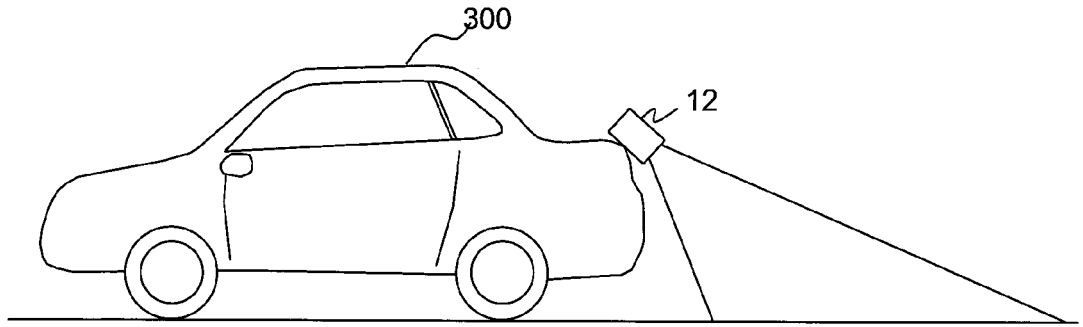
FIG. 3 is a view showing a mounting position of a camera.

FIG. 3 shows the camera 12 attached on the back of a vehicle 300. The camera 12 is slanted downward in some degree to take an image of the ground surface posterior to the vehicle, by using an image pickup device such as a Charge Coupled Device (CCD) image sensor or a Complementary Metal Oxide Semiconductor (CMOS) image sensor. Further, there is no limit to the position at which the camera 12 is attached. For example, the camera 12 can be attached on the front part of the vehicle 300 to take an image of the ground surface ahead of the vehicle.

Figure 4:
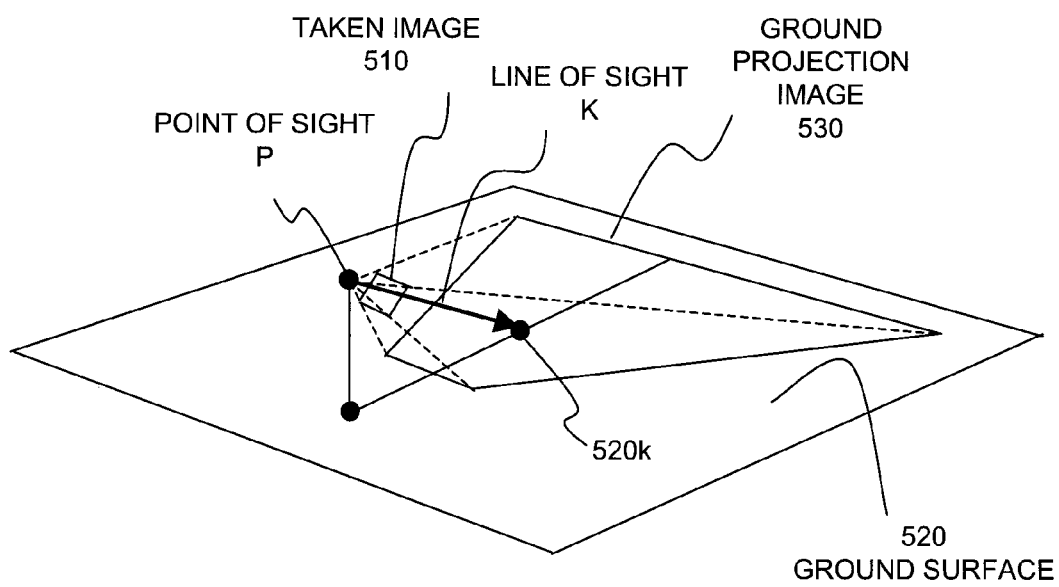
FIG. 4 is a view showing a state in which a taken image is projected on the ground surface.

FIG. 4 is a view for explaining a method of generating a ground projection image (i.e. an image obtained by projection on the ground) by using an image taken by the camera 12 of FIG. 3. The below-mentioned camera control part 104 obtains the position (a coordinate position in a 3D space with its origin at a prescribed position in the vehicle) of the point of sight P of the camera 12 and the image-taking direction (the line of sight) K. Then, the camera control part 104 generates a ground projection image 530 by projecting the taken image 510 on the ground surface 520 in the image-taking direction K from the position of the point of sight P of the camera 12. Here, the image-taking direction K intersects the taken image 510 perpendicularly at its center. Further, the distance from the point of sight P of the camera 12 to the taken image 510 is determined previously. The thus-generated ground projection image 530 is like a bird's-eye view of an area in the neighborhood of the vehicle seen from the sky over the vehicle.

The vehicle-mounted network communication unit 13 connects the navigation device 100 with a network (not shown) supporting a vehicle control network standard such as CAN or the like, and performs communication with an Electronic Control Unit (ECU) as another vehicle control unit connected with the network, by sending and receiving CAN messages to and from the ECU.

Figure 5:
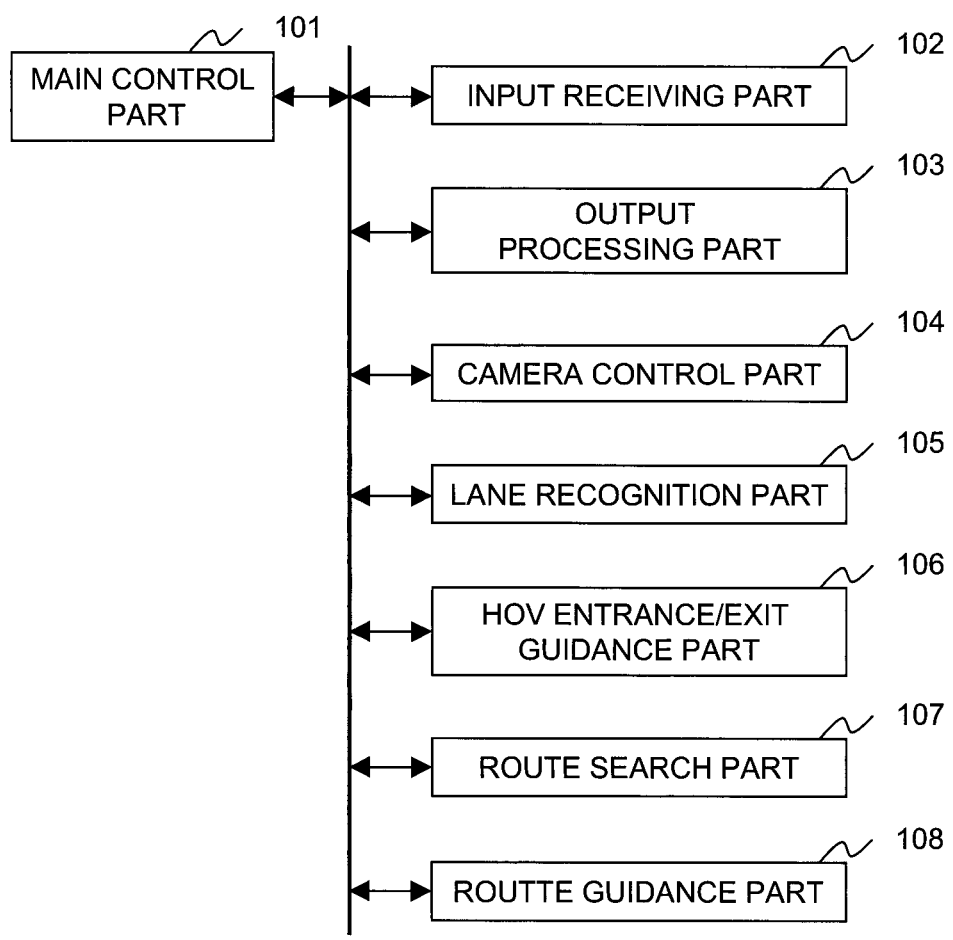
FIG. 5 is a functional block diagram showing a processing part.

FIG. 5 is a functional block diagram showing the processing part 1. As shown in the figure, the processing part 1 comprises a main control part 101, an input receiving part 102, an output processing part 103, the camera control part 104, a lane recognition part 105, an HOV entrance/exit guidance part 106, a route search part 107, and a route guidance part 108

The main control part 101 is a central functional part that performs various types of processing. The main control part 101 controls other processing parts depending on a content of processing. Further, the main control part 101 obtains information from various sensors, the GPS receiver 9 and the like, and performs map matching processing and the like to identify the current location. Further, at an appropriate time, the main control part 101 associates the date and time of traveling with the location, to record in the storage unit 3 a traveling history for each link. Further, in response to a request from each processing part, the main control part 101 outputs the current time.

The input receiving part 102 receives an instruction inputted from the user through the input unit 5 or the microphone 41, and controls each part of the processing part 1 so that processing corresponding to the content of the request is performed. For example, in the case where the user requests a search for a recommended route, the input receiving part 102 requests the output processing part 103 to perform processing for displaying a map for setting a destination on the display 2.

The output processing part 103 receives screen information to display (such as polygon information, for example), converts the received information into a signal so that the information can be drawn on the display 2, and instructs the display 2 to perform drawing.

The camera control part 104 controls operation of the camera 12. For example, the camera control part 104 sets timing of start and end of taking an image by the camera 12. Further, the camera control part 104 controls sending of the taken image to the lane recognition part 105.

The lane recognition part 105 obtains an image (as image data) taken by the camera 12, and converts the obtained image to an image for displaying (a ground projection image). Further, from the obtained image, the lane recognition part 105 recognizes marks and the like laid or colored on the road surface, to identify the lane in which the vehicle is traveling. For example, as described later, when the lane recognition part 105 recognizes existence of, for example, a mark (a diamond painting) indicating an HOV lane nearly at the center in the width direction of the image, then the lane recognition part 105 judges that the vehicle 300 is traveling in an HOV lane. Or, when the lane recognition part 105 recognizes the mark not nearly at the center in the width direction of the image but in a position closer to the right or left side and additionally the mark is on the edge side of the image beyond a lane mark seen from the vicinity of the center, then the lane recognition part 105 judges that the vehicle is traveling not in an HOV lane but in the lane adjacent to an HOV lane.

The HOV entrance/exit guidance part 106 guides the user at an entrance or an exit of an HOV lane concerning entrance or exit between the HOV lane and an ordinary lane. In detail, at an entrance or an exit of an HOV lane (usually an entrance and an exit are not distinguished, being used for both purposes), the HOV entrance/exit guidance part 106 informs the user by use of voice/image or the like to the effect that the vehicle should go into the HOV lane, or that the vehicle should go out of the HOV lane, or that the vehicle should keep the traveling lane. In such guidance, if it is possible to go out of the HOV lane to the ordinary lane without deviating from the recommended route, then the HOV entrance/exit guidance part 106 can tell the existence of the HOV lane at an entrance of the previous HOV lane, as described below. On the other hand, if the vehicle will be forced to deviate from the recommended route since it is impossible to leave the HOV lane, then the HOV entrance/exit guidance part 106 guides the user by leading the user not to go into the HOV lane at the nearest entrance/exit or by keeping the user unadvised of the existence of the entrance of the HOV lane, although there is such entrance/exit into which the user can go.

If there is a possibility of deviation from the recommended route, then the HOV entrance/exit guidance part 106 gives the user guidance such as "Entry into the HOV lane leads to deviation from the recommended route", as caution not to go into the HOV lane at an entrance section to the HOV lane. Of course, it is possible not to inform the user of existence of the HOV lane. In such a situation, the HOV entrance/exit guidance part 106 advises the user to exit at an exit section from the HOV lane. As the exit section from the HOV lane, the HOV entrance/exit guidance part 106 identifies the nearest exit section (the closest exit section to the current location) among the exit sections allowing exit from the HOV lane on the recommended route. This is to minimize a range of deviation from the recommended route as far as possible.

In other words, if it is judged before an entrance to the HOV lane (for example, 200 m before the start position of a section allowing entrance to the HOV lane) that the HOV lane ready to be entered has no exit section allowing exit without deviating from the recommended route, the HOV entrance/exit guidance part 106 prevents entrance into the HOV lane in guiding the user. Or, the HOV entrance/exit guidance part 106 leads the user to exit from the HOV lane at the nearest exit from the HOV lane.

Further, at an entrance section to an HOV lane that allows traveling without deviating from the recommended route, the HOV entrance/exit guidance part 106 informs the user of the existence of the entrance of the HOV lane. In that case also, the HOV entrance/exit guidance part 106 advises the user to exit from the HOV lane at an exit section from the HOV lane. In so doing, the HOV entrance/exit guidance part 106 identifies, as the exit section from the HOV lane, the most distant exit section (i.e. the closest exit section to the destination) among the exit sections allowing exit from the HOV lane on the recommended route. The reason is to travel in the HOV lane as far as possible.

In other words, if it is judged before an entrance to the HOV lane (for example, 200 m before the start position of a section allowing entrance to the HOV lane) that the HOV lane ready to be entered has an exit section allowing exit without deviating from the recommended route, the HOV entrance/exit guidance part 106 does not prevent entrance to the HOV lane in guiding the user. Further, the HOV entrance/exit guidance part 106 leads the user to exit from the HOV lane at the most distant exit from the HOV lane.

The route search part 107 searches for the optimum route (recommended route) that connects the departure place designated by the user or the current location to the destination. In performing the route search, route search logic such as the Dijkstra's algorithm is employed to search for a route on the basis of a link cost previously set to each prescribed section (i.e. link) of roads. In this processing, the route for which the link cost becomes minimum is searched for without considering routes using an HOV lane.

The route guidance part 108 guides the user in driving operation, by using the speaker 42 and/or the display 2 so that the current location of the vehicle does not deviate from the recommended route. Further, the route guidance part 108 instructs the HOV entrance/exit guidance part 106 to perform guidance to an entrance to an HOV lane or to an exit to an ordinary lane.

The above-described functional parts of the processing part 1, namely, the main control part 101, the input receiving part 102, the output processing part 103, the camera control part 104, the lane recognition part 105, the HOV entrance/exit guidance part 106, the route search part 107 and the route guidance part 108, are each realized when the CPU 21 reads and executes a prescribed program. To that end, the RAM 22 stores the program for realizing processing of each functional part.

The above-described components are results of component classification of the navigation device 100 according to main contents of processing, in order to make it easy to understand the configuration of the navigation device 100. Thus, the way of classification of components and their names do not restrict the present invention. The components of the navigation device 100 can be classified into a larger number of components according to contents of processing. Or, it is possible to classify components such that each component performs more contents of processing.

Further, each functional part may be realized by hardware (such as ASIC or GPU). Further, processing of each functional part may be performed by one hardware unit or by a plurality of hardware units.

[Description of Operation]

Figure 6:
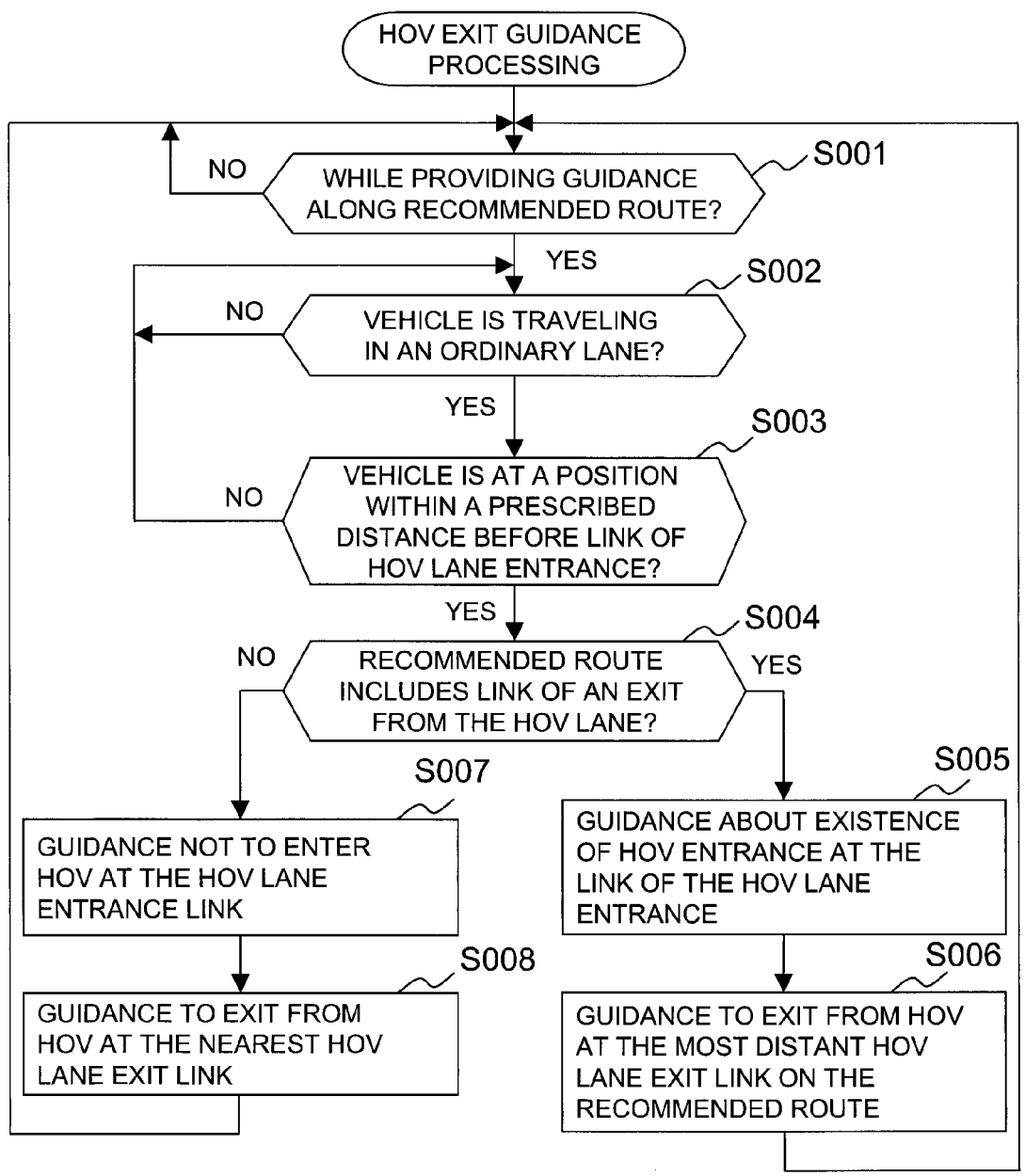
FIG. 6 is a flowchart showing HOV exit guidance processing.

Next, operation of HOV exit guidance processing performed by the navigation device 100 will be described. FIG. 6 is a flowchart showing HOV exit guidance processing performed by the navigation device 100. This flow is started when the navigation device 100 is powered on to be activated.

First, the HOV entrance/exit guidance part 106 judges whether guidance along a recommended route is being performed (Step S001). In detail, the HOV entrance/exit guidance part 106 judges whether the route guidance part 108 is performing route guidance or not.

If guidance in a recommended route is not being performed ("No" in Step S001), the HOV entrance/exit guidance part 106 returns the control to Step S001. If guidance in a recommended route is being performed ("Yes" in Step S001), then the HOV entrance/exit guidance part 106 judges whether the vehicle is traveling in an ordinary lane or not (Step S002). In detail, the HOV entrance/exit guidance part 106 requests the lane recognition part 105 to judge whether the vehicle is traveling in an ordinary lane or not. The lane recognition part 105 obtains an HOV attribute 228 of the lane in which the vehicle is traveling, to judge whether the vehicle is traveling in an ordinary lane. If the HOV attribute of the lane in which the vehicle is traveling is "exclusive", the lane recognition part 105 judges that the vehicle is not traveling in an ordinary lane. On the other hand, if the HOV attribute of the lane in which the vehicle is traveling is "none", the lane recognition part 105 judges that the vehicle is traveling in an ordinary lane. If the HOV attribute of the lane in which the vehicle is traveling is "shared", the lane recognition part 105 uses an image taken by the camera 12 to judge whether the vehicle is traveling an HOV lane or not.

In the case where the vehicle is not traveling an ordinary lane ("No" in Step S002), the HOV entrance/exit guidance part 106 returns the control to Step S002. In the case where the vehicle is traveling an ordinary lane ("Yes" in Step S002), the HOV entrance/exit guidance part 106 judges whether the vehicle is at a position within a prescribed distance before a link of an HOV lane entrance through which the vehicle can enter an HOV lane (for example, 200 m before the start node of the entrance link in question) or not (Step S003).

If the vehicle is not within the prescribed distance before a link of an HOV lane entrance through which the vehicle can enter an HOV lane ("No" in Step S003), the HOV entrance/exit guidance part 106 returns the control to Step S002. If the vehicle is within the prescribed distance before a link of an HOV lane entrance through which the vehicle can enter an HOV lane ("Yes" in Step S003), the HOV entrance/exit guidance part 106 judges whether the recommended route includes a link of an exit through which the vehicle can exit from the HOV lane (Step S004). That is to say, the HOV entrance/exit guidance part 106 judges whether the vehicle can travel in the HOV lane without deviating from the recommended route.

In the case where the recommended route includes a link of an exit from the HOV lane in question ("Yes" in Step S004), the HOV entrance/exit guidance part 106 informs the user that there is an HOV entrance in a link of an entrance of the HOV lane (Step S005). For example, the HOV entrance/exit guidance part 106 gives the user guidance such as "There is an HOV entrance".

Then, the HOV entrance/exit guidance part 106 leads the user to exit from the HOV lane at the most distant HOV lane exit link on the recommended route (Step S006). In detail, the HOV entrance/exit guidance part 106 registers (records), in a storage area (not shown) such as a storage area of the RAM 22, that at the link of the most distant exit (i.e. the link of the exit closest to the destination) among links that allow exit from the HOV lane on the recommended route the user should be advised to exit from the HOV lane. Then, arriving at the link of the exit in question, the HOV entrance/exit guidance part 106 gives a message to the user that the vehicle should exit from the HOV lane. Then, the control is returned to Step S001.

In the case where the recommended route does not include a link of an exit from the HOV lane in question ("No" in Step S004), the HOV entrance/exit guidance part 106 leads the user not to enter the HOV lane at the link of the HOV lane entrance in question (Step S007). In detail, about the link of the HOV lane entrance that has been judged to be at the prescribed distance from the vehicle in Step S003, the HOV entrance/exit guidance part 106 gives to the user a message leading the user not to enter the HOV lane, for example by issuing a warning "Entry into the HOV lane leads to deviation from the recommended route". Or, it is possible that the HOV entrance/exit guidance part 106 does not inform the existence of the HOV lane so as to lead the user not to enter the HOV lane.

Then, the HOV entrance/exit guidance part 106 leads the user to exit from the HOV lane at the link of the nearest HOV lane exit beyond the HOV lane entrance in question (Step S008). In detail, it is registered in a storage area (not shown), for example a storage area of the RAM 22, by the HOV entrance/exit guidance part 106 that, at the link of the exit closest to the current location among links that allow exit from the HOV lane on the recommended route, the user should be advised to exit from the HOV lane. Then, arriving at the link of the registered exit, the HOV entrance/exit guidance part 106 gives a message to the user that the vehicle should exit from the HOV lane. This is to minimize a range of deviation from the recommended route. Then, the control is returned to Step S001.

Hereinabove, the content of the HOV exit guidance processing has been described. By performing the above-described HOV exit guidance processing, the navigation device 100 can guide the user appropriately at an entrance and an exit of an HOV lane. That is to say, the user can travel in an HOV lane appropriately without deviating from the recommended route. Further, even in the case of occurrence of deviation from the recommended route, it is possible to minimize the effect of the deviation.

The above processing assumes traveling in an HOV lane of an expressway, but the invention is not limited to this configuration. For example, guidance at an entrance and an exit of an HOV lane can be performed in an ordinary road. By doing so, it is possible to dispel user's uneasiness as to whether traveling in an HOV lane can keep the user in the recommended route or whether traveling in an HOV lane may result in deviation from the recommended route.

Figure 7A:
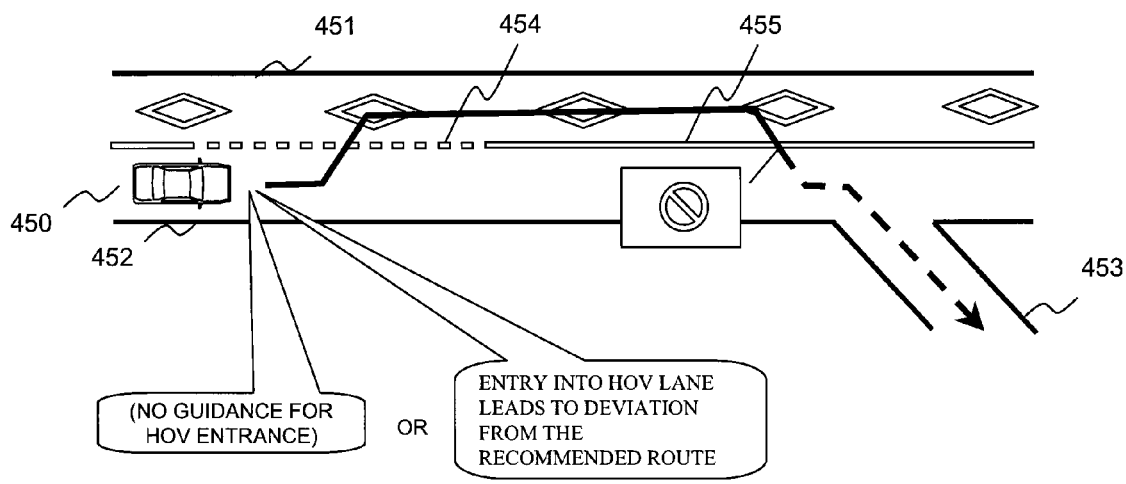
FIGS. 7A and 7B are views illustrating the HOV exit guidance processing in a specific example.
Figure 7B:
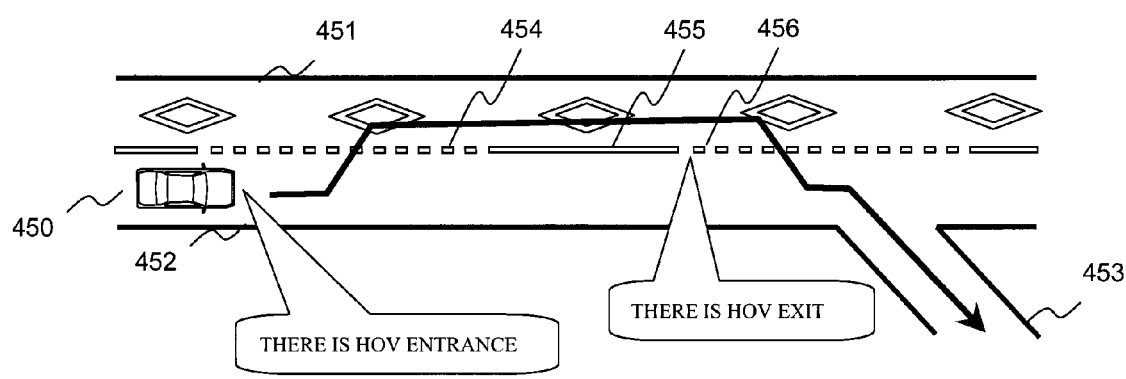

FIGS. 7A and 7B are views showing examples of the HOV exit guidance processing in a more specific scene.

In FIGS. 7A and 7B, it is assumed that a vehicle traveling in an ordinary lane 452 of a road 450 having the ordinary lane 452 and an HOV lane 451 is moving toward a branch road 453 leading to a destination. In FIG. 7A, it is assumed that there is only one entrance/exit 454 between the ordinary lane 452 and the HOV lane 451 of the road 450 before the branch road 453. In other words, beyond the entrance/exit 454, there is provided a no-entering/exiting section 455 in which entrance and exit between the ordinary lane 452 and the HOV lane 451 are prohibited. Further, in FIG. 7B, it is assumed that there are two places of entrance/exit between the ordinary lane 452 and the HOV lane 451 of the road 450 before the branch road 453, namely an entrance/exit 454 that is closer to the vehicle and an entrance/exit 455 that is distant from the vehicle and beyond the no-entering/exiting section 455.

In FIG. 7A, a link of exit allowing exit from the HOV lane 451 is not included in the section up to the branch road 453 (since the entrance/exit 454 is regarded as an entrance seen from the vehicle traveling in the ordinary lane). Thus, the navigation device 100 does not inform the user of existence of an entrance to the HOV lane 451 at the entrance/exit 454. Further, the navigation device 100 gives voice guidance telling "Entry into the HOV lane leads to deviation from the recommended route".

On the other hand, in FIG. 7B, a link of exit (the entrance/exit 456) allowing exit from the HOV lane 451 is included in the section up to the branch road 453. Thus, at the entrance/exit 454, the navigation device 100 informs the user of existence of an entrance to the HOV lane 451, for example by giving voice guidance telling "There is HOV entrance" or the like. In addition, at the entrance/exit 456, the navigation device 100 gives voice guidance telling "There is HOV exit".

Hereinabove, an embodiment relating to the first point of the invention has been described. According to this embodiment relating to the first point of the invention, the navigation device 100 can appropriately guide the user at an entrance of an HOV lane when the user traveling along the recommended route approaches the entrance.

The present invention is not limited to the above-described embodiment relating to the first point of the invention. The above-described embodiment relating to the first point of the invention can be varied variously within the spirit and scope of the invention. For example, as for the lane recognition processing by the lane recognition part 105, the lane recognition may be performed on the basis of high-precision location information of GPS or information received from oscillators laid on each lane for lane recognition.

Figure 8:
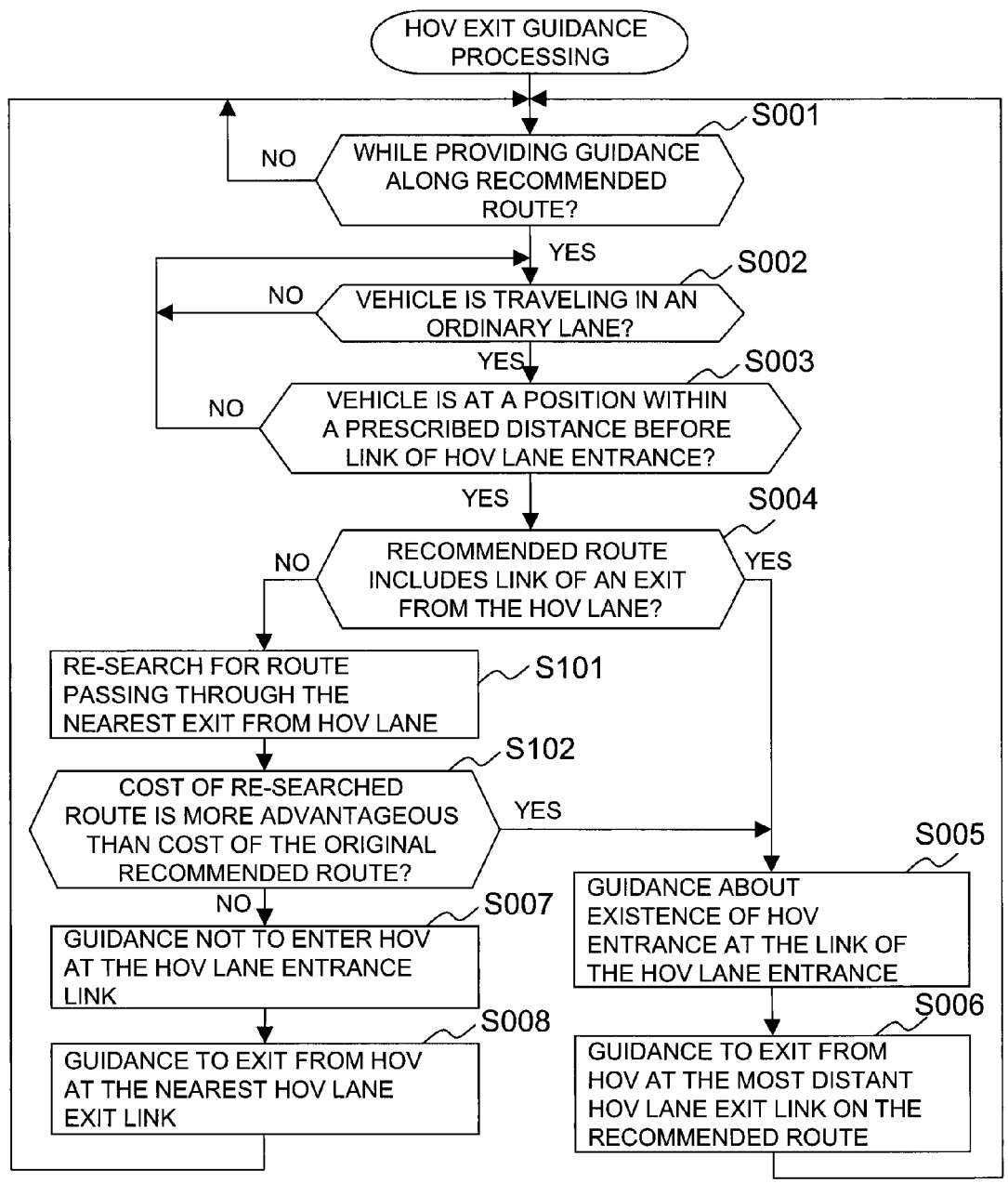
FIG. 8 is a flowchart showing a variation of the HOV exit guidance processing.

Further, the flow of the HOV exit guidance processing may be changed, for example, as shown in FIG. 8. FIG. 8 is a chart showing a variation of the HOV exit guidance processing. As shown in FIG. 8, according to the present variation, Step S101 and Step S102 are included between the Step S004 and Step S007 of the HOV exit guidance processing.

In Step S101, the HOV entrance/exit guidance part 106 searches for a route that passes through the nearest exit from the HOV lane (Step S101). In detail, the HOV entrance/exit guidance part 106 instructs the route search part 107 to search for a recommended route to the destination, taking the current location as a starting point. At that time, the HOV entrance/exit guidance part 106 instructs the route search part 107 to make a search such that the recommended route becomes a route passing through the nearest exit from the HOV lane.

Then, the HOV entrance/exit guidance part 106 compares the cost of the re-searched route with the cost of the remaining part of the recommended route along which the guidance is now given, to judge whether the cost of the re-searched route is more advantageous or not (Step S102). In detail, the HOV entrance/exit guidance part 106 calculates the cost of the route re-searched in Step S101, and compares the calculated cost with the cost of the remaining section of the recommended route along which the guidance is given. When the cost of the re-searched route is lower, it is judged that the cost of the re-searched route is more advantageous.

Then, in the case where the cost of the re-searched route is more advantageous ("Yes" in Step S102), the HOV entrance/exit guidance part 106 proceeds to the processing in Step S005. In the case where the HOV entrance/exit guidance part 106 judges that the cost of the re-searched route is not more advantageous ("No" in Step S102), the route guidance part 108 sets the re-searched route as a new recommended route, and the processing proceeds to Step S007.

Figure 9:
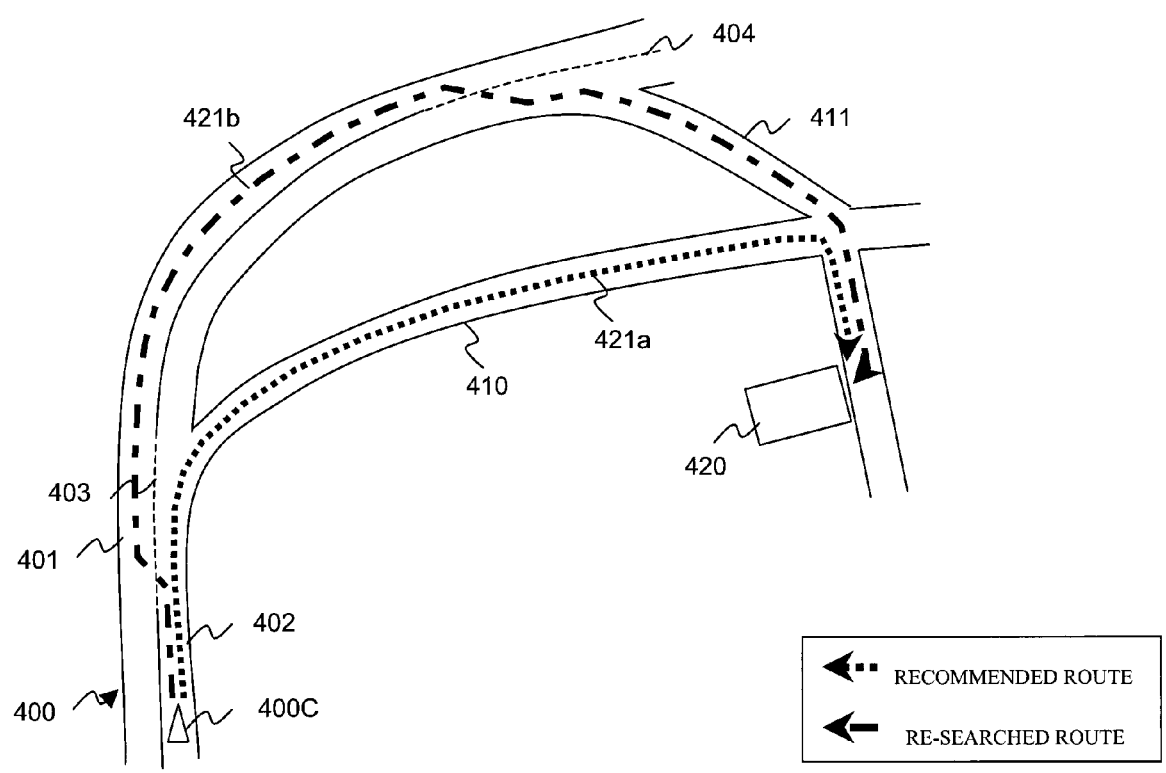
FIG. 9 is a view illustrating the variation of the HOV exit guidance processing in a specific example.

Hereinabove, a variation of the HOV exit guidance processing has been described. The above variation will be described taking a specific example of FIG. 9. FIG. 9 is a view illustrating the HOV exit guidance processing according to the above-described variation in a specific scene.

FIG. 9 shows a recommended route 421a in the case where a vehicle 400c traveling in an ordinary lane 402 of a road 400 having the ordinary lane 402 and an HOV lane 401 is moving toward a destination 420. Here, as entrance/exit between the ordinary lane 402 and the HOV lane 401 of the road 400, two places, namely an entrance/exit 403 closer to the vehicle and an entrance/exit 404 distant from the vehicle are shown. Further, as for the recommended route 421a, it is shown that the vehicle enters from the road 400 to a branch road 410 in the neighborhood of the entrance/exit 403, to move toward the destination 420.

Here, the recommended route 421a does not include a link of an exit for moving out of the HOV lane 401 (since the entrance/exit 403 is regarded as an entrance seen from the vehicle 400C traveling in the ordinary lane). Thus, by re-searching, the navigation device 100 obtains a route 421b passing through the entrance/exit 404 that becomes the nearest exit from the HOV lane 401, and compares the cost of the route 421b with the cost of the route 421a. If the cost of the route 421b is advantageous, the navigation device 100 does not inhibit entering the HOV lane 401 at the entrance/exit 403 (i.e. informs the user of the existence of the HOV lane). And, at the entrance/exit 404, the navigation device 100 leads the user to exit from the HOV lane at the entrance/exit 404. If the cost of the route 421b is not advantageous, the navigation device 100 leads the user not to enter the HOV lane 401 at the entrance/exit 403, and leads the user to exit from the HOV lane 401 at the nearest entrance/exit 404. In that case, deviation from the recommended route 421a occurs, and thus the route 421b is set as a new recommended route. Hereinabove, embodiments relating to the first point of the invention have been described.

Next, a navigation device to which a first embodiment relating to the second point of the invention is applied will be described referring to drawings.

Figure 10:
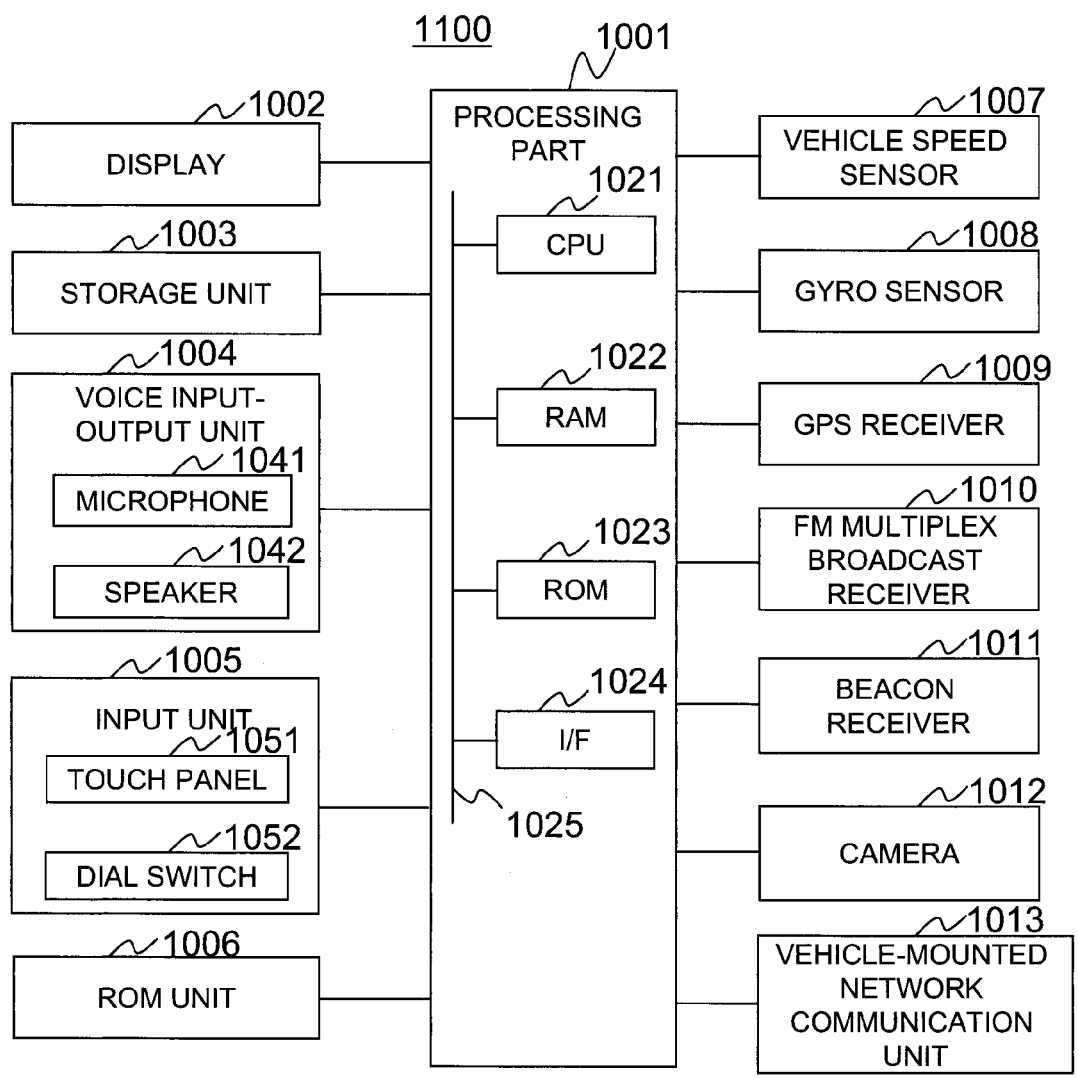
FIG. 10 is a schematic block diagram showing a navigation device.

FIG. 10 is a diagram showing a general configuration of the navigation device 1100. As a so-called navigation device, the navigation device 1100 can display map information to indicate a point denoting the current location of the navigation device 1100 and information for guidance of a route to a designated destination.

The navigation device 1100 comprises a processing part 1001, a display 1002, a storage unit 1003, a voice input-output unit 1004 (having a microphone 1041 as a voice input unit and a speaker 1042 as a voice output unit), an input unit 1005, a ROM unit 1006, a vehicle speed sensor 1007, a gyro sensor 1008, a Global Positioning System (GPS) receiver 1009, an FM multiplex broadcast receiver 1010, a beacon receiver 1011, a camera 1012, and a vehicle-mounted network communication unit 1013.

The processing part 1001 is a central unit that performs various types of processing. For example, the processing part 1001 calculates a current location on the basis of information outputted from the various types of sensors 1007, 1008, the GPS receiver 1009, the FM multiplex broadcast receiver 1010 and the like. Further, based on the obtained current location information, the processing part 1001 reads out map data required for display from the storage unit 1003 or the ROM unit 1006.

Further, the processing part 1001 expands the read map data into graphics, superimposes a mark denoting the current location on the graphics, and displays the result on the display 1002. Further, by using map data and the like stored in the storage unit 1003 or the ROM unit 1006, the processing part 1001 searches for the optimum route (recommended route) connecting a departure place designated by the user or the current location to a destination (or a way point or a stopover point). Further, the processing part 1001 guides the user by using the speaker 1042 and/or the display 1002.

Further, the processing part 1001 can guide driving at an entrance/exit of a High-Occupancy Vehicles (HOV) lane in the course of route guidance. An HOV lane is a lane for which it is prescribed that only a vehicle carrying at least a prescribed number of passengers (for example, two including a driver) or a vehicle satisfying specific criteria (such as fuel efficiency standards or low-pollution criteria) can travel in it.

Further, in a situation that traffic merges with a road having an HOV lane in the course of route guidance, the processing part 1001 can inform the user of the position of the HOV lane. For example, the processing part 1001 makes a message displayed or voice information outputted through the speaker 1042, to inform the user of existence of an HOV lane on the left side.

The processing part 1001 of the navigation device 1100 is constructed by connecting component devices through a bus 1025. The processing part 1001 comprises: a Central Processing Unit (CPU) 1021, which executes various types of processing such as numerical operation and control of each component device; a Random Access Memory (RAM) 1022 for storing map data, operation data and the like read from the storage unit 1003; a Read Only Memory (ROM) 1023 for storing programs and data; and an interface (I/F) 1024 for connecting various hardware units with the processing part 1001.

The display 1002 is a unit for displaying graphics information generated by the processing part 1001 or the like. The display 1002 comprises a liquid crystal display, an organic EL display, or the like.

The storage unit 1003 comprises a storage medium that is at least readable-writable, such as a Hard Disk Drive (HDD), a nonvolatile memory card, or the like.

This storage medium stores a link table 1200, i.e. map data (including link data concerning links as components of each road on a map) required for an ordinary route search device.

Figure 11:
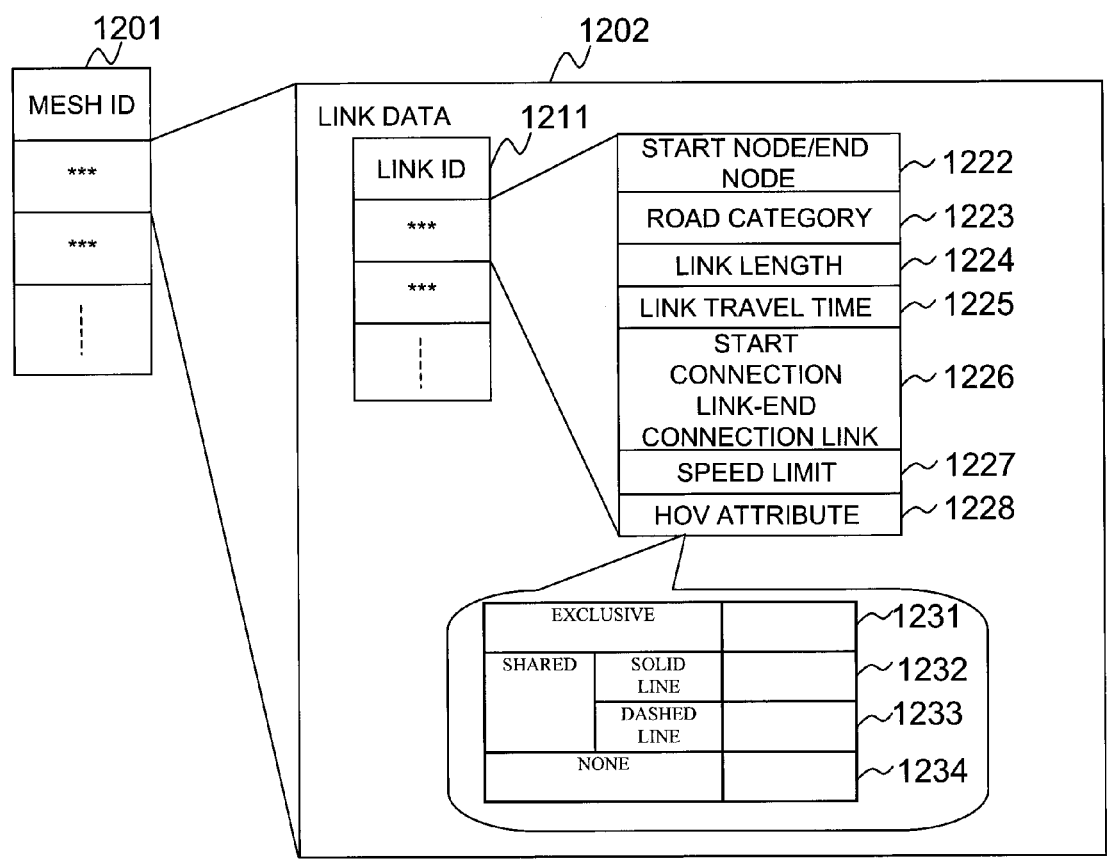
FIG. 11 is a diagram showing structure of a link table.

FIG. 11 is a diagram showing structure of the link table 1200. For each identification code (a mesh ID) 1201 of a mesh as a compartment area on a map, the link table 1200 contains link data 1202 for each of links constituting the roads included in the mesh area.

For each link ID 1211 as an identifier of a link, the link data 1202 includes: coordinate information 1222 of two nodes (a start node and an end node) constituting the link; a road category 1223, which indicates a category of the road including the link in question; a link length 1224, which indicates the length of the link; a link travel time 1225 stored previously; a start connection link-end connection link 1226, which specifies a start connection link as a link connecting to the start node of the link in question and an end connection link as a link connecting to the end node of the link in question; a speed limit 1227, which indicates a speed limit of the road including the link in question; an HOV attribute 1228, which specifies an attribute concerning a state of setting-up of an HOV lane for the link; and the like.

As the HOV attribute 1228, the link in question has a "exclusive" attribute 1231 when the link consists of HOV lanes only: and a "none" attribute 1234 when the link is not provided with an HOV lane. Further, when the link in question has both HOV lane and ordinary lane and a lane change is prohibited in the road at that link, the link has a "shared-solid line" attribute 1232. And, when the link in question has both HOV lane and ordinary lane and a lane change is permitted, the link has a "shared-dashed line" attribute 1233. Thus, it is said that the HOV attribute 1228 stores information specifying a setting-up state of an HOV lane.

Here, the two nodes constituting a link are distinguished as a start node and an end node, so that the upbound direction and the downbound direction of the same road are managed as different links respectively.

Description will be give returning to FIG. 10. The voice input-output unit 1004 comprises the microphone 1041 as a voice input unit and the speaker 1042 as a voice output unit. The microphone 1041 obtains sound outside the navigation device 1100, such as voice coming from the user or another passenger.

The speaker 1042 outputs, as voice, a message that is generated for the user by the processing part 1001. The microphone 1041 and the speaker 1042 are placed separately at predefined positions of a vehicle. However, they may be housed in an integral case. The navigation device 1100 can be provided with a plurality of microphones 1041 and/or a plurality of speakers 1042.

The input unit 1005 is a device for receiving an instruction from the user through operation of the user. The input unit 1005 comprises a touch panel 1051, a dial switch 1052, a scroll key as another hard switch (not shown), a scale change key, and the like. Further, the input unit 1005 includes a remote control that can remotely give an operating instruction to the navigation device 1100. The remote control is provided with a dial switch, a scroll key, a scale change key and the like, and can send information of operation of each key or switch to the navigation device 1100.

The touch panel 1051 is mounted on the display surface side of the display 1002, and it is possible to see the display screen through the touch panel 1051. The touch panel 1051 specifies a touched position in relation to the X-Y coordinate of an image displayed on the display 1002, converts the position into a coordinate, and outputs the obtained coordinate. The touch panel 1051 comprises pressure-sensitive type or electrostatic type input detection elements or the like.

The dial switch 1052 is constructed so as to be rotatable clockwise and counterclockwise, generates a pulse signal for each rotation of a prescribed angle, and outputs the generated pulse signals to the processing part 1001. The processing part 1001 obtains the angle of rotation on the basis of the number of the pulse signals.

The ROM unit 1006 comprises a storage medium that is at least readable such as a Read-Only Memory (ROM) (such as a CD-ROM or a DVD-ROM) or an Integrated Circuit (IC) card. Such a storage medium stores moving image data or voice data, for example.

The vehicle speed sensor 1007, the gyro sensor 1008 and the GPS receiver 1009 are used for the navigation device 1100 to detect the current location (i.e. the location of the vehicle itself). The vehicle speed sensor 1007 is a sensor that outputs a value used for calculating the vehicle speed. The gyro sensor 1008 comprises an optical-fiber gyroscope, a vibrational gyroscope, or the like, and detects an angular velocity due to turning of a moving body. The GPS receiver 1009 receives signals from GPS satellites and measures a distance between a moving body and each GPS satellite and a rate of change of that distance with respect to three or more satellites, in order to measure the current location, the traveling speed and a traveling direction of the moving body.

The FM multiplex broadcast receiver 1010 receives an FM multiplex broadcast signal sent from an FM multiplex broadcast station. As FM multiplex broadcast, general current-state traffic information, traffic regulation information, Service Area/Parking Area (SA/PA) information, parking lot information, weather information and the like of Vehicle Information Communication System (VICS, a registered trademark) information, and text information provided as FM multiplex general information from a radio station can be received.

The beacon receiver 11 receives general current-state traffic information, traffic regulation information, Service Area/Parking Area (SA/PA) information, parking lot information, weather information, emergency information and the like of, for example, VICS information. For example, an optical beacon receiver using light-wave communication and a radio beacon receiver using radio wave can be mentioned as the beacon receiver.

Figure 12:
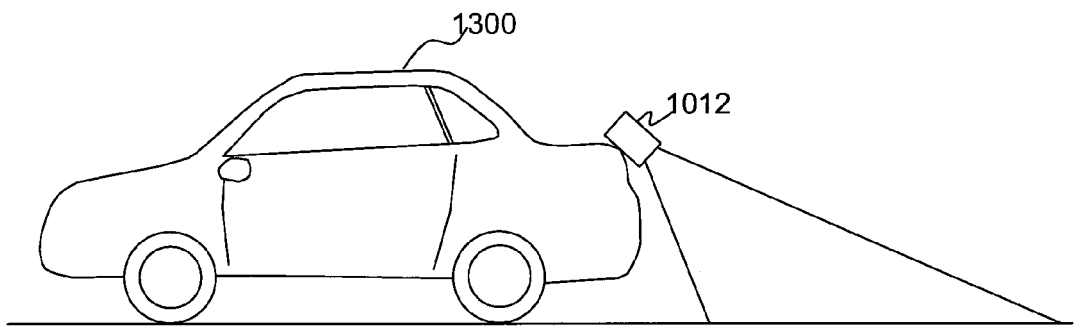
FIG. 12 is a view showing a mounting position of a camera.

FIG. 12 shows the camera 1012 attached on the back of a vehicle 1300. The camera 1012 is slanted downward in some degree to take an image of the ground surface posterior to the vehicle, by using an image pickup device such as a Charge Coupled Device (CCD) image sensor or a Complementary Metal Oxide Semiconductor (CMOS) image sensor. Further, there is no limit to the position at which the camera 1012 is attached. For example, the camera 1012 can be attached on the front part of the vehicle 1300 to take an image of the ground surface ahead of the vehicle.

Figure 13:
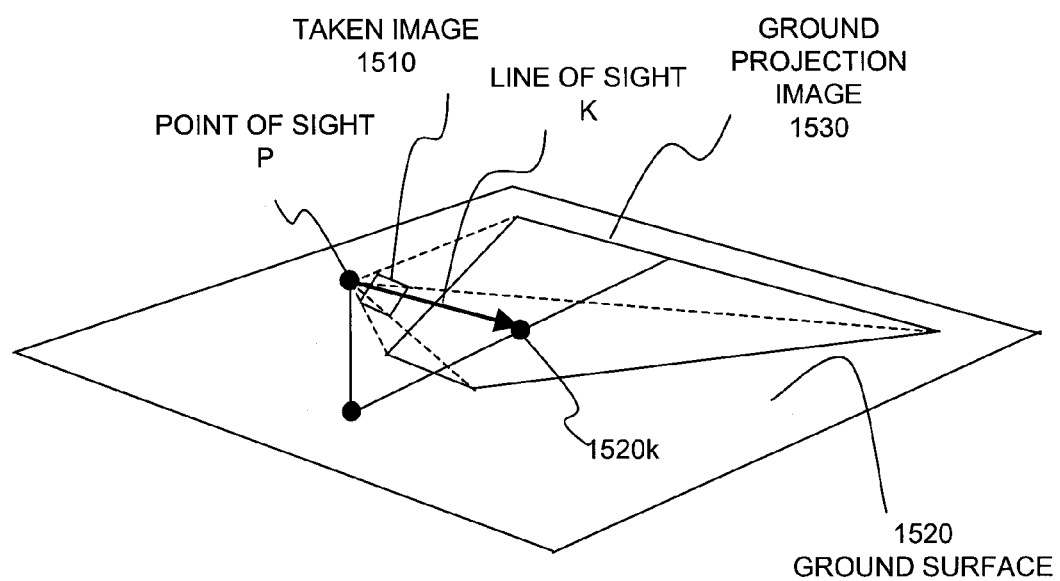
FIG. 13 is a view showing a state in which a taken image is projected on the ground surface.

FIG. 13 is a view for explaining a method of generating a ground projection image (i.e. an image obtained by projection on the ground) by using an image taken by the camera 1012 of FIG. 12. The below-mentioned camera control part 1104 obtains the position (a coordinate position in a 3D space with its origin at a prescribed position in the vehicle) of the point of sight P of the camera 1012 and the image-taking direction (i.e. the line of sight) K. Then, the camera control part 1104 generates a ground projection image 1530 by projecting the taken image 1510 on the ground surface 1520 in the image-taking direction K from the position of the point of sight P of the camera 1012. Here, the image-taking direction K intersects the taken image 1510 perpendicularly at its center. Further, the distance from the point of sight P of the camera 1012 to the taken image 1510 is determined previously. The thus-generated ground projection image 1530 is like a bird's-eye view of an area in the neighborhood of the vehicle seen from the sky over the vehicle.

The vehicle-mounted network communication unit 1013 connects the navigation device 1100 with a network (not shown) supporting a vehicle control network standard such as CAN or the like, and performs communication with an Electronic Control Unit (ECU) as another vehicle control unit connected with the network, by sending and receiving CAN messages to and from the ECU.

Figure 14:
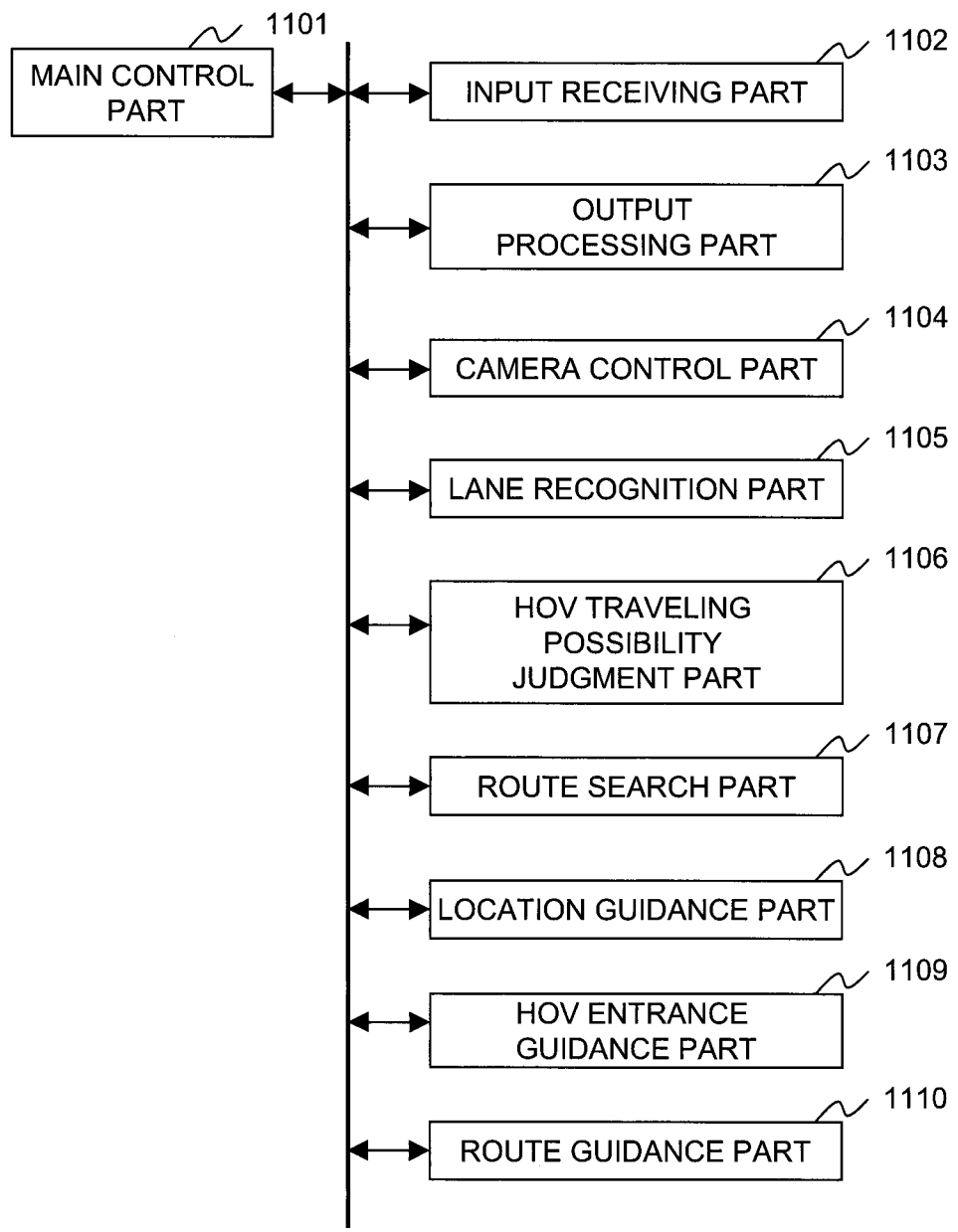
FIG. 14 is a functional block diagram showing a processing part.

FIG. 14 is a functional block diagram showing the processing part 1001. As shown in the figure, the processing part 1001 comprises a main control part 1101, an input receiving part 1102, an output processing part 1103, the camera control part 1104, a lane recognition part 1105, an HOV traveling possibility judgment part 1106, a route search part 1107, a location guidance part 1108, an HOV entrance guidance part 1109, and a route guidance part 1110.

The main control part 1101 is a central functional part that performs various types of processing. The main control part 1101 controls other processing parts depending on a content of processing. Further, the main control part 1101 obtains information from various sensors, the GPS receiver 1009 and the like, and performs map matching processing and the like to identify the current location. Further, at an appropriate time, the main control part 1101 associates the date and time of traveling with the location, to record in the storage unit 1003 a traveling history for each link. Further, in response to a request from each processing part, the main control part 1101 outputs the current time.

The input receiving part 1102 receives an instruction inputted from the user through the input unit 1005 or the microphone 1041, and controls each part of the processing part 1001 so that processing corresponding to the content of the request is performed. For example, in the case where the user requests a search for a recommended route, the input receiving part 1102 requests the output processing part 1103 to perform processing for displaying a map for setting a destination on the display 1002.

The output processing part 1103 receives screen information to display information (such as polygon information, for example), converts the received information into a signal so that the information can be drawn on the display 1002, and instructs the display 1002 to perform drawing.

The camera control part 1104 controls operation of the camera 1012. For example, the camera control part 1104 sets timing of start and end of taking an image by the camera 1012. Further, the camera control part 1104 controls sending of the taken image to the lane recognition part 1105.

The lane recognition part 1105 obtains an image (as image data) taken by the camera 1012, and converts the obtained image to an image for displaying (a ground projection image). Further, from the obtained image, the lane recognition part 1105 recognizes marks and the like laid or colored on the road surface, to identify the lane in which the vehicle is traveling. For example, as described later, when the lane recognition part 1105 recognizes existence of, for example, a mark (a diamond painting) indicating an HOV lane nearly at the center in the width direction of the image, then the lane recognition part 1105 judges that the vehicle 1300 is traveling in an HOV lane. Or, when the lane recognition part 1105 recognizes the mark not nearly at the center in the width direction of the image but in a position closer to the right or left side and additionally the mark is on the edge side of the image beyond a lane mark seen from the vicinity of the center, then the lane recognition part 1105 judges that the vehicle is traveling not in an HOV lane but in the lane adjacent to an HOV lane.

The HOV traveling possibility judgment part 1106 judges whether the vehicle 1300 is allowed to travel in an HOV lane or not. In judging the traveling possibility, the HOV traveling possibility judgment part 1106 makes judgment, through the vehicle-mounted network communication unit 1013, on the type and the like of the vehicle 1300 on the basis of communication information flowing through the vehicle-mounted network of the vehicle 1300, and determines whether the vehicle is of the type that is allowed to travel in the HOV lane. Of course, the judgment of traveling possibility is not limited to this. For example, the HOV traveling possibility judgment part 1106 may identify the number of passengers by means of a load sensor (not shown) attached on each seat of the vehicle or by means of seat belt wearing sensors, to judge whether the number of passengers reaches the required number for traveling in an HOV lane.

The route search part 1107 searches for the optimum route (recommended route) that connects the departure place designated by the user or the current location to the destination. In performing the route search, route search logic such as the Dijkstra's algorithm is employed to search for a route on the basis of a link cost previously set to each specific section (i.e. link) of roads. This processing is performed on the basis of the above judgment by the HOV traveling possibility judgment part 1106 on whether the vehicle is in a condition possible for traveling in an HOV lane. If the vehicle is in a condition possible for traveling in an HOV lane, the search for a recommended route is performed by giving priority to a route using an HOV lane. If the vehicle is not in a condition possible for traveling in an HOV lane, the route search part 1107 searches for a route for which the link cost is least, without considering an HOV lane. In this processing, if the vehicle is already traveling in an HOV lane although it is judged that the vehicle is not in a condition allowing traveling in the HOV lane, the route search part 1107 searches for a recommended route by giving priority to a route using the HOV lane. In judging whether the vehicle is already traveling in an HOV lane or not, the route search part 1107 refers to the HOV attribute 1228 of the link to which the current location belongs. If the HOV attribute 1228 is "exclusive", the route search part 1107 judges that the vehicle is traveling in an HOV lane. If the HOV attribute 1228 is "none", the route search part 1107 judges that the vehicle is not traveling in an HOV lane. And, if the HOV attribute 1228 is "shared", the route search part 1107 makes the judgment by requesting the lane recognition part 1105 to judge whether the traveling lane is an HOV lane or not.

The location guidance part 1108 informs the user of existence and location of a merging point with another road or a branch point to another road by using image or voice. For example, before a merging location of a branch line with a main line of, for example, an expressway, the location guidance part 1108 outputs a display informing the user that the merging point is coming closer or informing the user of the approximate distance to the merging point, to the display 1002 through the output processing part 1103. Further, for example at a branch point from a main line to a ramp of an expressway, the location guidance part 1108 informs the user which lane the vehicle should travel in, by voice through the speaker 1042.

The HOV entrance guidance part 1109 guides the user at an entrance or an exit of an HOV lane concerning entrance or exit between the HOV lane and an ordinary lane. In detail, at an entrance or an exit of an HOV lane (usually an entrance and an exit are not distinguished, being used for both purposes), the HOV entrance guidance part 1109 informs the user by use of voice/image or the like that the vehicle should go into the HOV lane, or that the vehicle should go out of the HOV lane, or that the vehicle should keep the traveling lane.

The route guidance part 1110 guides the user in his driving operation, by using the speaker 1042 and/or the display 1002 so that the current location of the vehicle does not deviate from the recommended route. Further, at an entrance/exit of an HOV lane, the route guidance part 1110 requests the HOV entrance guidance part 1109 to perform guidance to an entrance to an HOV lane or to an exit to an ordinary lane. Further, in merging to a road having an HOV lane, the route guidance part 1110 requests the location guidance part 1108 to informs the user of the existence of the HOV lane or the distance to the merging point.

The above-described functional parts of the processing part 1001, namely, the main control part 1101, the input receiving part 1102, the output processing part 1103, the camera control part 1104, the lane recognition part 1105, the HOV traveling possibility judgment part 1106, the route search part 1107, the location guidance part 1108, the HOV entrance guidance part 1109, and the route guidance part 1110, are each realized when the CPU 1021 reads and executes a prescribed program. To that end, the RAM 1022 stores the program for realizing processing of each functional part.

The above-described components are results of component classification of the navigation device 1100 according to main contents of processing, in order to make it easy to understand the configuration of the navigation device 1100. Thus, the way of classification of components and their names do not restrict the present invention. The components of the navigation device 1100 can be classified into a larger number of components according to contents of processing. Or, it is possible to classify components such that each component performs more contents of processing.

Further, each functional part may be realized by hardware (such as ASIC or GPU). Further, processing of each functional part may be performed by one hardware unit or by a plurality of hardware units.

[Description of Operation]

Figure 15:
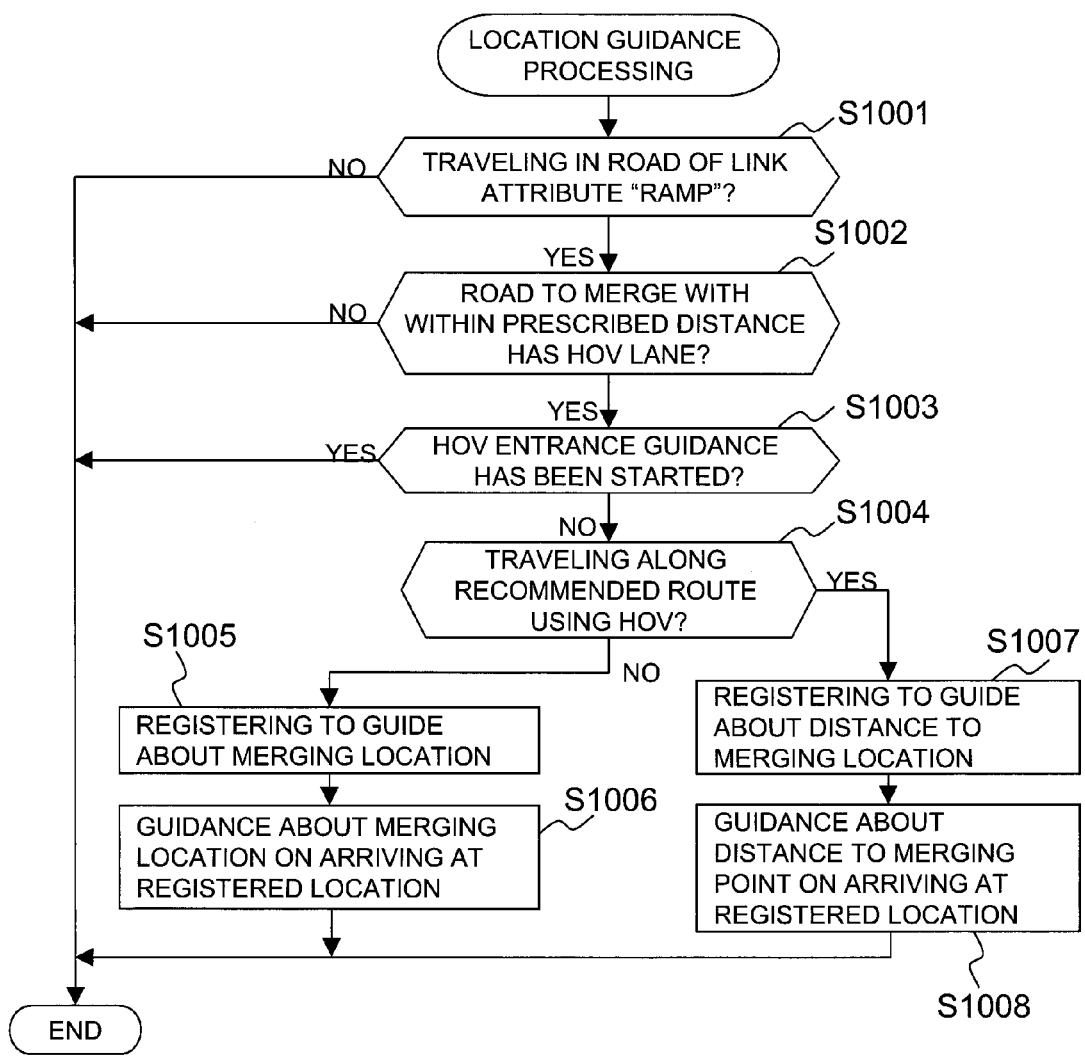
FIG. 15 is a flowchart showing location guidance processing.

Next, operation of location guidance processing performed by the navigation device 1100 according to the first embodiment will be described. FIG. 15 is a flowchart showing the location guidance processing performed by the navigation device 1100. This flow is started when the navigation device 1100 is powered on to be activated.

First, the location guidance part 1108 judges whether the vehicle is traveling in a road at a link having an attribute "ramp" (Step S1001). In detail, the location guidance part 1108 obtains the current location from the main control part 1101, identifies the road category 1223 as the attribute of the link to which the current location belongs, and judges whether the category in question is "ramp" or not. A ramp refers to a road for connecting different roads with each other, mainly at a two-level crossing. For example, it is a sloping road including a road for connecting an expressway and an ordinary road.

If the attribute of the link of the road in which the vehicle is traveling is not "ramp" ("No" in Step S1001), the location guidance part 1108 ends the location guidance processing.

If the attribute of the link of the road in which the vehicle is traveling is "ramp" ("Yes" in Step S1001), the location guidance part 1108 judges whether a road to merge with a road in which the vehicle is traveling within a prescribed distance has an HOV lane (Step S1002). In detail, the location guidance part 1108 judges whether a road (link) that will join a road in which the vehicle is traveling within the prescribed distance from the current location includes a road whose HOV attribute 1228 is "exclusive" or "shared". In the processing of searching for a merging point within the prescribed distance from the current location, the main control part 1101 searches for a merging point within the prescribed distance on the recommended route if the recommended route has been set. If the recommended route has not been set, the main control part 1101 searches for a merging point within the prescribed distance in the traveling direction on the currently-traveling road. Then, based on the search result, the location guidance part 1108 judges whether there is a merging point with a road having an HOV lane.

If there is not a merging point with a road having an HOV lane within the prescribed distance ("No" in Step S1002), the location guidance part 1108 returns the processing to Step S1001.

If there is a merging point with a road having an HOV lane within the prescribed distance ("Yes" in Step S1002), the location guidance part 1108 judges whether entrance guidance to the HOV lane has been already started (Step S1003). In detail, the location guidance part 1108 makes the judgment by inquiring the HOV entrance guidance part 1109 whether it is in the course of performing guidance of an HOV entrance/exit.

If the HOV entrance guidance has been started ("Yes" in Step S1003), the location guidance part 1108 ends the location guidance processing.

If the HOV entrance guidance has not been started ("No" in Step S1003), the location guidance part 1108 judges whether the vehicle is traveling along the recommended route that uses an HOV lane (Step S1004). In detail, the location guidance part 1108 inquires of the route guidance part 1110 whether the recommended route as the object of the route guidance is a route using an HOV lane.

If the vehicle is not traveling along a recommended route that uses an HOV lane ("No" in Step S1004), the location guidance part 1108 registers (i.e. records), in a storage area (not shown) or the like, that the user should be informed of the merging location at the merging location of the merging road specified in Step S1002 (Step S1005). Then, the location guidance part 1108 suspends its processing until the vehicle arrives at the registered location. And, when the vehicle arrives at the registered location, the location guidance part 1108 informs the user of the merging location (Step S1006), and ends the location guidance processing.

If the vehicle is traveling along a recommended route that uses an HOV lane ("Yes" in Step S1004), the location guidance part 1108 registers, in a storage area (not shown) or the like, that the user should be informed of the distance to the merging node at the merging location of the merging road specified in Step S1002 (Step S1007). Then, the location guidance part 1108 suspends its processing until the vehicle arrives at the registered location. And, when the vehicle arrives at the registered location, the location guidance part 1108 informs the user of the distance to the merging node (Step S1008), and ends the location guidance processing.

Figure 16A:
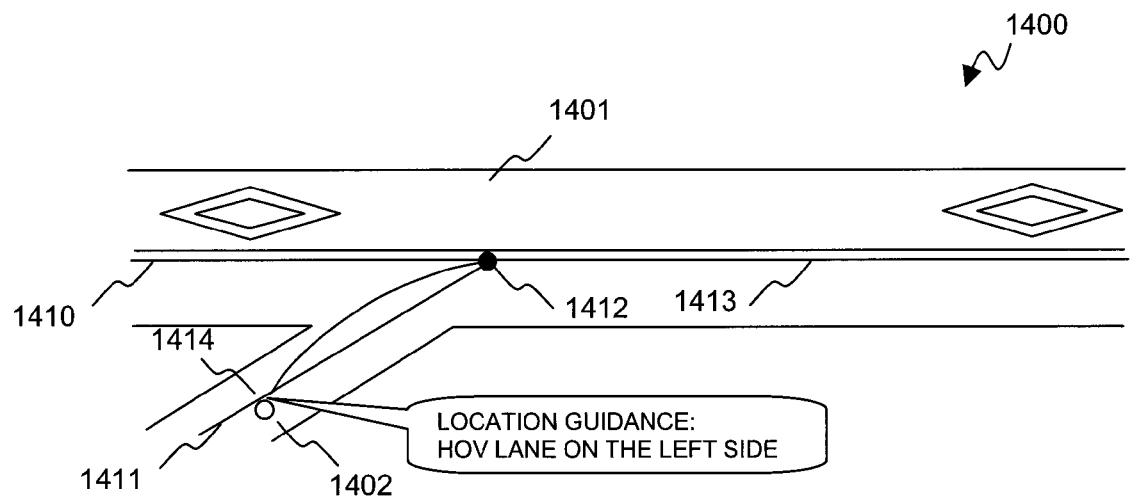
FIGS. 16A and 16B are views illustrating a specific example of the location guidance processing.
Figure 16B:
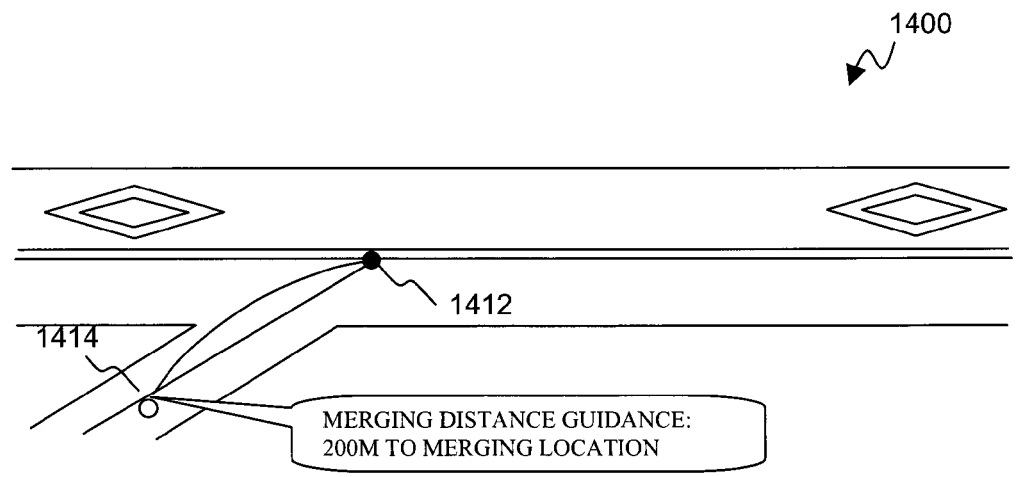

FIGS. 16A and 16B are views showing an example of traveling of a vehicle along a road 1400 that is shared by an HOV lane 1401 and one or more ordinary lanes. The road 1400 has a ramp 1402 that comes to merge with the road 1400.

A link 1410 as a component of the road 1400 merges with a link 1411 as a component of the ramp 1402 at a merging node 1412, and becomes a link 1413 after the merging. Further, FIG. 16A shows an example of location guidance (informing of a merging location) in the case where the recommended route does not include the links 1410, 1411 and 1413. This case corresponds to the case of performing Step S1006 in the location guidance processing of FIG. 15. The location guidance is realized by giving a location guidance such as "HOV lane exists on the left side" at the location 1414. Further, FIG. 16B shows an example of location guidance (informing the user of the distance to the merging node) in the case where the recommended route includes the links 1411 and 1413. This case corresponds to the case of performing S1008 in the location guidance processing of FIG. 15. The location guidance is realized by giving guidance about the distance to the merging point such as "200 m to the merging location" at the location 1414.

Hereinabove, the content of the location guidance processing has been described. By performing the above-described location guidance processing, the navigation device 1100 can avoid giving unnecessary guidance to the user. In the case where the vehicle is traveling in a route using an HOV lane, it is not necessary to inform the user of the existence and location of the HOV lane. In other words, it is sufficient for the user to know the distance to the merging point. On the other hand, in the case where the vehicle is not traveling in a route using an HOV lane, it is meaningful to inform the user of the existence and location of an HOV lane.

In summary, if it is judged in the location guidance processing that the current location is on a road merging into a road having an HOV lane, the user is informed of the distance to the merging point in a situation that the HOV lane is to be used. Otherwise, in a situation that the HOV lane is not to be used, the user is informed of existence of the HOV lane.

The above-described processing assumes traveling in a ramp of an expressway, but the invention is not limited to this. For example, the location guidance may be performed suitably also in a route including a road for returning from an ordinary road, a service area or the like, an entrance ramp from an ordinary road to an expressway, an exit ramp from an expressway to an ordinary road, or the like. That is to say, in the case where there is entry/exit to/from an expressway or the like or there is merging into a junction, location guidance may be inhibited in the course of traveling in a route using an HOV lane, and instead, distance guidance about the distance to the merging point may be performed. By doing so, it is possible to prevent occurrence of user's distraction due to unnecessary guidance given during high-speed traveling.

Hereinabove, the first embodiment relating to the second point of the invention has been described. According to the first embodiment relating to the second point of the invention, the navigation device 1100 can inhibit unnecessary guidance given to the user traveling in an HOV lane along the recommended route Next, a second embodiment relating to the second point of the invention will be described. The second embodiment relating to the second point of the invention has a configuration similar to but partly different from the first embodiment relating to the second point of the invention. According to the second embodiment relating to the second point of the invention, guidance on distance to a merging point instead of unnecessarily location guidance is provided in the HOV entrance guidance processing performed by the HOV guidance part 1109. This processing will be described in the following.

FIG. 17 is a flowchart showing the HOV entrance guidance processing performed by the navigation device 1100. This flow is started when the navigation device 1100 is powered on to be activated.

First, the HOV entrance guidance part 1109 judges whether the navigation device 1100 is set to use an HOV lane (Step S1101). In detail, among various types of setting information held in the navigation device 1100, the HOV entrance guidance part 1109 obtains information on use of an HOV lane (for example, which is set, "true" or "false", as information on use of an HOV lane) from the main control part 1101. Then, by referring to the obtained information, the HOV entrance guidance part 1109 judges whether the navigation device 1100 is set to use an HOV lane.

If the navigation device 1100 is not set up for the vehicle to use HOV lanes ("No" in Step S1101), the HOV entrance guidance part 1109 ends the HOV entrance guidance processing.

If the navigation device 1100 is set up for the vehicle to use an HOV lane ("Yes" in Step S1101), the HOV entrance guidance part 1109 judges whether the vehicle is allowed to travel in an HOV lane (Step S1102). In detail, the HOV entrance guidance part 1109 requests the HOV traveling possibility judgment part 1106 to judge whether the vehicle is allowed to travel in an HOV lane.

If the vehicle is not allowed to travel in an HOV lane ("No" in Step S1102), the HOV entrance guidance part 1109 ends the HOV entrance guidance processing.

If the vehicle is allowed to travel in an HOV lane ("Yes" in Step S1102), the HOV entrance guidance part 1109 identifies HOV attributes 1228 corresponding to the current time with respect to the links within a prescribed distance (Step S1103). In detail, the HOV entrance guidance part 1109 identifies the HOV attribute 1228 corresponding to the current time for each of the links within the prescribed distance (or within the prescribed distance on the recommended route).

Next, the HOV entrance guidance part 1109 excludes links whose attributes according to the current time are not "shared" from the objects of the HOV entrance guidance (Step S1104). In detail, for each of the links specified in the Step S1103, the HOV entrance guidance part 1109 excludes the link from the objects of the entrance guidance if its value of the HOV attribute 1228 is other than "shared", namely "exclusive" 1231 or "none" 1234. In other words, for each of the links specified in the Step S1103, HOV entrance guidance part 1109 specifies the link as an object of the HOV entrance guidance if its value of the HOV attribute 1228 is "shared".

Then, the HOV entrance guidance part 1109 performs the HOV entrance guidance with respect to neighboring links as objects of the HOV entrance guidance, in the order in which they come near (Step S1105). In detail, the HOV entrance guidance part 1109 registers (records), in a storage area (not shown), that entrance guidance should be performed more than once by giving information such as "Keep left. HOV lane is 500 m ahead" with respect to a link within a prescribed distance (for example, 500 m) from the current location among the links determined as the objects of the HOV entrance guidance in the step S1104.

Next, the HOV entrance guidance part 1109 judges whether there is a registered location for the location guidance by the location guidance part 1108 between the first guidance location and the second guidance location among a plurality of times of guidance of the HOV entrance guidance (Step S1106).

If there is not a registered location for the location guidance ("NO" in Step S1106), the HOV entrance guidance part 1109 performs usually the first and the second and subsequent HOV entrance guidance, and ends the HOV entrance guidance processing.

If there is a registered location for the location guidance ("Yes" in Step S1106), the HOV entrance guidance part 1109 performs location guidance (informing the user of the distance to the merging point) instead of the content of the first HOV entrance guidance, and then, the HOV entrance guidance part 1109 performs usually the second HOV entrance guidance, to end the HOV entrance guidance processing (Step S1107). In detail, the HOV entrance guidance part 1109 informs the user of the distance to the merging nodes (for example, by giving guidance such as "200 m to the merging location"), instead of the first HOV entrance guidance (such as "Keep left. HOV lane is 500 m ahead", for example), and cancels the registration of the location guidance.

Figure 18A:
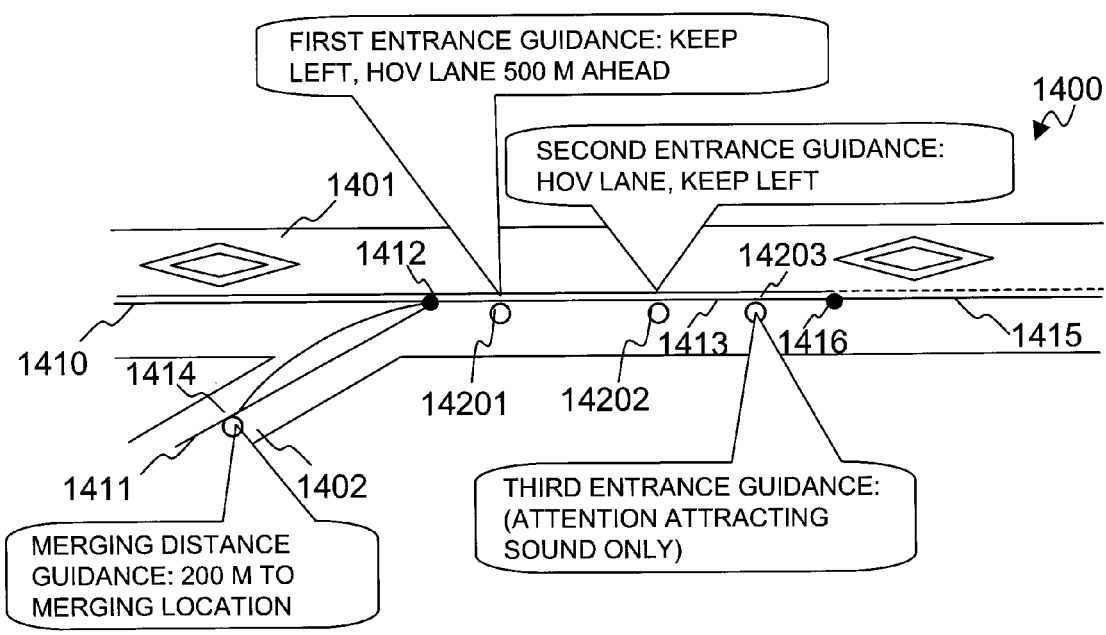
FIGS. 18A and 18B are views showing a specific example of the HOV entrance guidance processing.
Figure 18B:
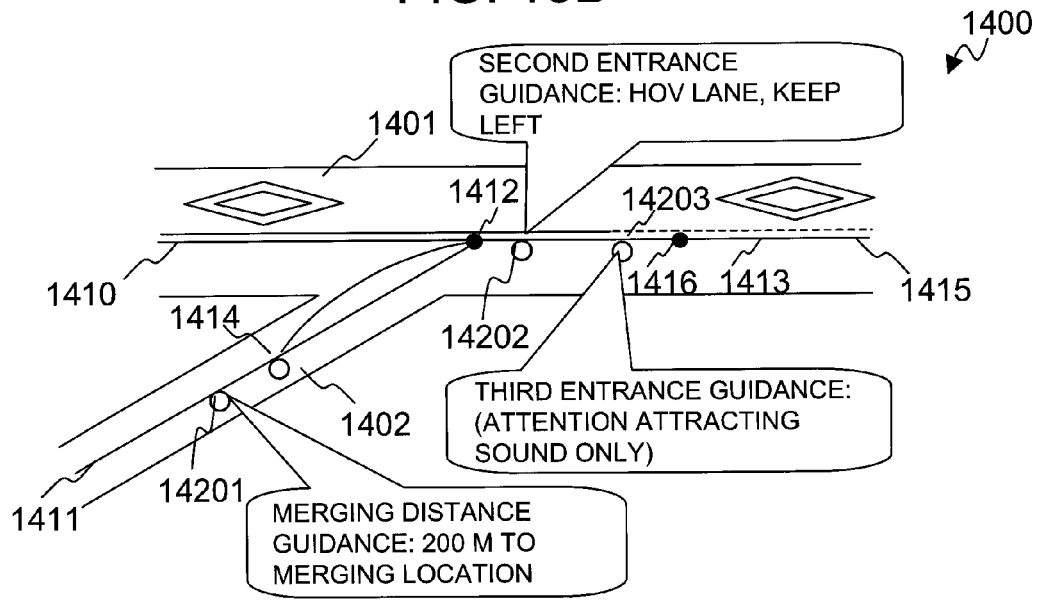

FIGS. 18A and 18B are views showing an example of traveling of a vehicle along a road 1400 that is shared by an HOV lane 1401 and one or more ordinary lanes. The road 1400 has a ramp that comes to merge with the road 1400. A link 1410 as a component of the road 1400 merges with a link 1411 as a component of the ramp 1402 at a merging node 1412, and becomes a link 1413 after the merging. Further, the link 1413 after the merging connects to an entrance/exit link 1415 as a link of a section that becomes an HOV entrance/exit at a node 1416 lying ahead.

FIG. 18A shows an example in which, at a prescribed location 1414 on the link 1411, the user is informed of merging with the merging node 1412 (for example, by location guidance of the location guidance part 1108, such as "200 m to the merging location") and the HOV entrance guidance part 1109 performs, at a prescribed location 14201 on the link 1413, first guidance of the HOV entrance guidance (for example, by giving guidance such as "Keep left. HOV lane is 500 m ahead"). Further, at a location 14202 that is closer to the entrance/exit link 1415 than the prescribed location 14201, the HOV entrance guidance part 1109 performs second guidance of the HOV entrance guidance (for example, by giving guidance such as "HOV lane. Keep left", for example). At a location 14203 that is more closer to the entrance/exit link 1415 than the prescribed location 14202, the HOV entrance guidance part 1109 performs third guidance of the HOV entrance guidance (for example, by giving forth a beep sound or an attention attracting sound of a prescribed tone). In the situation of FIG. 18A, location guidance (informing the user of the distance to the merging point) is not given between the first guidance and the third guidance of HOV entrance guidance, and thus there is nothing that confuses the user.

FIG. 18B shows an example where merging distance guidance to the merging node 1412 is not given at a prescribed location 1414 on the link 1411, but the HOV entrance guidance part 1109 gives merging distance guidance such as "200 m to the merging location" at a prescribed location 14201 on the link 1411, instead of the first guidance of the HOV entrance guidance. Similarly to the case shown in FIG. 18A, at a location 14202 more closer to the entrance/exit link 1415 than the prescribed location 14201, the HOV entrance guidance part 1109 gives second guidance of the HOV entrance guidance (for example, "HOV lane. Keep left"). Further, at a location 14203 that is more closer to the entrance/exit link 1415 than the prescribed location 14202, the HOV entrance guidance part 1109 gives third guidance of the HOV entrance guidance (for example, a beep sound or an attention attracting sound of a prescribed tone). In the situation of FIG. 18B, location guidance (merging distance guidance) is given between the first guidance and the third guidance of the HOV entrance guidance, and thus it is possible to reduce the number of times to provide guidance in order not to confuse the user.

Hereinabove, the content of the HOV entrance guidance processing has been described. By performing the above-described HOV entrance guidance processing, the navigation device 1100 can avoid giving inappropriate guidance to the user. In the course of performing the entrance guidance to guide for an entrance of an HOV lane, it is not necessary to give guidance for informing the user of the existence and location of the HOV lane. Rather, such guidance can mislead the user into believing that there exist a plurality of HOV lanes. On the other hand, in the case where the entrance guidance to guide for an entrance of an entrance of HOV lane is not being performed, it is meaningful to give guidance for informing the user of the existence and location of the HOV lane. Thus, according to the present embodiment, it is possible to avoid giving inappropriate guidance to the user.

The above-described processing assumes traveling in a ramp of an expressway, but the invention is not limited to this. For example, the location guidance may be performed suitably also in a route including a road for returning from an ordinary road, a service area or the like, an entrance ramp from an ordinary road to an expressway, an exit ramp from an expressway to an ordinary road, or the like. That is to say, in the case where there is entry into or exit from an expressway or the like or merging into a junction, location guidance may be inhibited, and instead, distance guidance telling the distance to the merging point may be performed. By so doing, it is possible to prevent occurrence of user's distraction due to unnecessary guidance.

The above HOV entrance guidance processing has been described with respect to the case where sections between the location to give first guidance and the location to give second guidance out of a plurality of times of guidance include a location at which location guidance should be given. However, the invention is not limited to this. That is to say, in the case where sections between the location to give second guidance and the location to give third guidance include a location to give location guidance, the first guidance may be replaced by location guidance. Of course, in that case, the second guidance may be replaced by location guidance.

In summary, as to the HOV entrance guidance part 1109 that gives guidance about an entrance of an HOV lane within a prescribed distance a plurality of times within the prescribed distance, it is said as follows. That is to say, in the case where sections, in which guide for an entrance is given a plurality of times within a prescribed distance, include a merging point for which the location guidance part 1108 can give guidance for informing the user of the existence of the HOV lane, the HOV entrance guidance part 1109 gives guidance for the distance to the merging point, instead of the guidance informing the user of the existence of the HOV lane.

Hereinabove, the second embodiment relating to the second point of the invention has been described. According to the second embodiment relating to the second point of the invention, the navigation device 1100 can inhibit giving unnecessary guidance to the user who receives the HOV entrance guidance.

The present invention is not limited to the above-described first and second embodiments relating to the second point of the invention. The above-described first and second embodiments relating to the second point of the invention can be varied variously within the spirit and scope of the invention. For example, as for the lane recognition processing by the lane recognition part 1105, the lane recognition may be performed on the basis of high-precision location information of GPS or information received from oscillators laid on each lane for lane recognition.

Further, during guidance along the recommended route using an HOV lane, it is possible not to inform the user of existence of the HOV lane before passing the merging point into the road having the HOV lane. By so doing, it is possible to give carefully-selected guidance, which is beneficial to the user who wants to concentrate his attention on driving.

Further, according to the above-described second embodiment relating to the second point of the invention, the first guidance of the HOV lane entrance guidance is replaced by guidance informing the user of the distance to the merging point if the latter clashes with the HOV lane entrance guidance. However, the invention is not limited to this, and it is possible to notify the user of the existence of the HOV lane. By so doing, it is possible to let the user know the existence of the HOV lane early, and thus it is possible to guide the user so as to join the traffic ahead without pulling too much into the HOV lane side. Each process described in the first and second embodiments and the above-described variations may be performed separately or in arbitrary combination.

Next, a navigation device to which the third point of the invention is applied will be described referring to the drawings.

Figure 19:
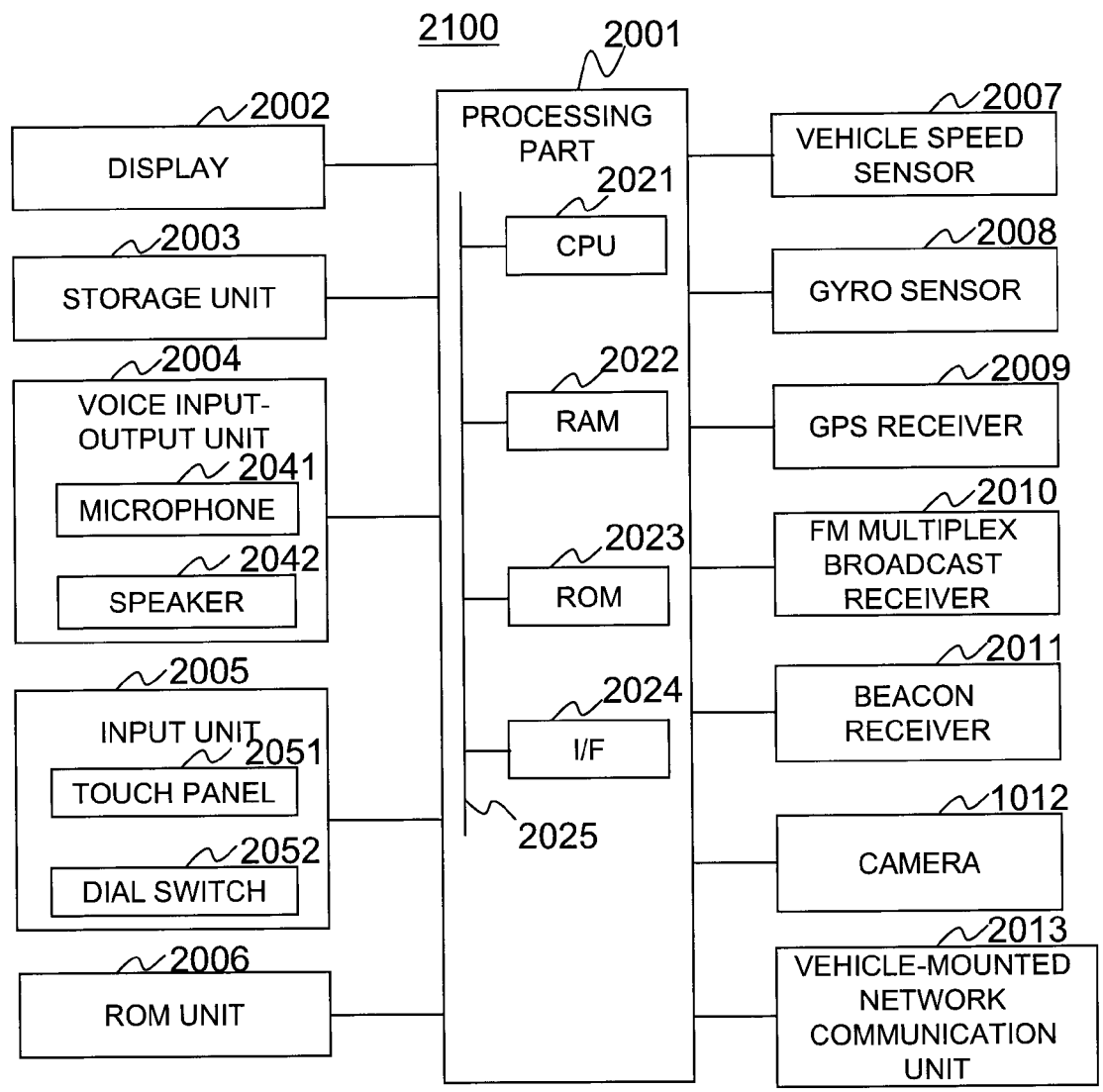
FIG. 19 is a schematic block diagram of a navigation device.

FIG. 19 is a general schematic block diagram showing the navigation device 2100. As a so-called navigation device, the navigation device 2100 can display map information to indicate a point denoting the current location of the navigation device 100 and information for guidance of a route to a designated destination.

The navigation device 2100 comprises a processing part 2001, a display 2002, a storage unit 2003, a voice input-output unit 2004 (having a microphone 2041 as a voice input unit and a speaker 2042 as a voice output unit), an input unit 2005, a ROM unit 2006, a vehicle speed sensor 2007, a gyro sensor 2008, a Global Positioning System (GPS) receiver 2009, an FM multiplex broadcast receiver 2010, a beacon receiver 2011, a camera 2012, and a vehicle-mounted network communication unit 2013.

The processing part 2001 is a central unit that performs various types of processing. For example, the processing part 2001 calculates a current location on the basis of information outputted from the various types of sensors 2007, 2008, the GPS receiver 2009, the FM multiplex broadcast receiver 2010 and the like. Further, based on the obtained current location information, the processing part 2001 reads out map data required for display from the storage unit 2003 or the ROM unit 2006.

Further, the processing part 2001 expands the read map data into graphics, superimposes a mark denoting the current location on the graphics, and displays the result on the display 2002. Further, by using map data and the like stored in the storage unit 2003 or the ROM unit 2006, the processing part 2001 searches for the optimum route (recommended route) connecting a departure place designated by the user or the current location to a destination (or a way point or a stopover point). Further, the processing part 2001 guides the user by using the speaker 20042 and/or the display 2002.

Further, the processing part 2001 can guide driving at an entrance/exit of a High-Occupancy Vehicles (HOV) lane in the course of route guidance. An HOV lane is a lane for which it is prescribed that only a vehicle carrying at least a prescribed number of passengers (for example, two including a driver) or a vehicle satisfying specific criteria (such as fuel efficiency standards or low-pollution criteria) can travel in it.

The processing part 2001 of the navigation device 2100 is constructed by connecting component devices through a bus 2025. The processing part 2001 comprises: a Central Processing Unit (CPU) 2021, which executes various types of processing such as numerical operation and control of each component device; a Random Access Memory (RAM) 2022 for storing map data, operation data and the like read from the storage unit 2003; a Read Only Memory (ROM) 2023 for storing programs and data; and an interface (I/F) 2024 for connecting various hardware units with the processing part 2001.

The display 2002 is a unit for displaying graphics information generated by the processing part 2001 or the like. The display 2002 comprises a liquid crystal display, an organic EL display, or the like.

The storage unit 2003 comprises a storage medium that is at least readable-writable, such as a Hard Disk Drive (HDD), a nonvolatile memory card, or the like.

This storage medium stores a link table 2200, i.e. map data (including link data concerning links as components of each road on a map) required for an ordinary route search device.

Figure 20:
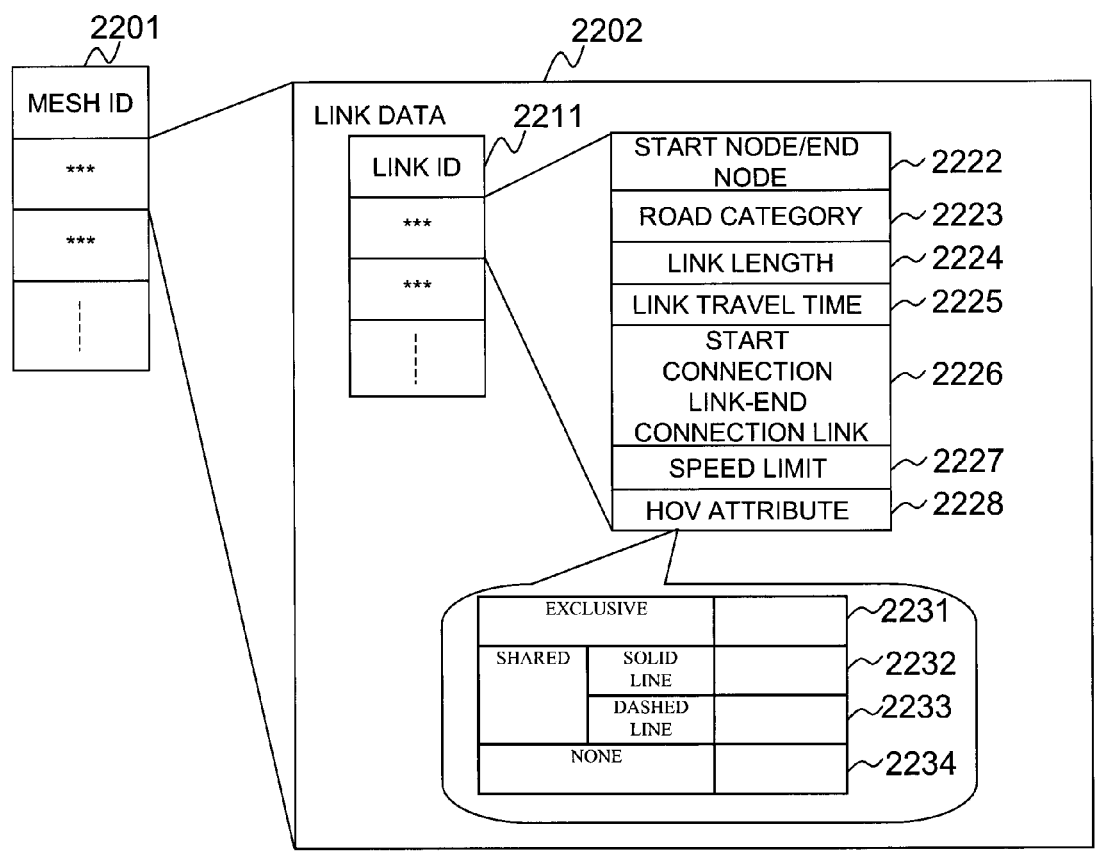
FIG. 20 is a diagram showing structure of a link table.

FIG. 20 is a diagram showing structure of the link table 2200. For each identification code (a mesh ID) 2201 of a mesh as a compartment area on a map, the link table 2200 contains link data 2202 for each of links constituting the roads included in the mesh area.

For each link ID 2211 as an identifier of a link, the link data 2202 includes: coordinate information 2222 of two nodes (a start node and an end node) constituting the link; a road category 2223, which indicates a category of the road including the link in question; a link length 2224, which indicates the length of the link; a link travel time 2225 stored previously; a start connection link-end connection link 2226, which specifies a start connection link as a link connecting to the start node of the link in question and an end connection link as a link connecting to the end node of the link in question; a speed limit 2227, which indicates a speed limit of the road including the link in question; an HOV attribute 2228, which specifies an attribute concerning a state of setting-up of an HOV lane for the link; and the like.

As the HOV attribute 2228, the link in question has a "exclusive" attribute 2231 when the link consists of HOV lanes only: and a "none" attribute 2234 when the link is not provided with an HOV lane. Further, when the link in question has both HOV lane and ordinary lane and a lane change is prohibited in the road at that link, the link has a "shared-solid line" attribute 2232. And, when the link in question has both HOV lane and ordinary lane and a lane change is permitted, the link has a "shared-dashed line" attribute 2233. Thus, it is said that the HOV attribute 2228 stores information specifying a state of setting-up of an HOV lane.

Here, the two nodes constituting a link are distinguished as a start node and an end node, so that the upbound direction and the downbound direction of the same road are managed as different links respectively.

Description will be given returning to FIG. 19. The voice input-output unit 2004 comprises the microphone 2041 as a voice input unit and the speaker 2042 as a voice output unit. The microphone 2041 obtains sound outside the navigation device 2100, such as voice coming from the user or another passenger.

The speaker 2042 outputs, as voice, a message that is generated for the user by the processing part 2001. The microphone 2041 and the speaker 2042 are placed separately at predefined positions of a vehicle. However, they may be housed in an integral case. The navigation device 2100 can be provided with a plurality of microphones 2041 and/or a plurality of speakers 2042.

The input unit 2005 is a device for receiving an instruction from the user through operation of the user. The input unit 2005 comprises a touch panel 2051, a dial switch 2052, a scroll key as another hard switch (not shown), a scale change key, and the like. Further, the input unit 2005 includes a remote control that can remotely give an operating instruction to the navigation device 2100. The remote control is provided with a dial switch, a scroll key, a scale change key and the like, and can send information of operation of each key or switch to the navigation device 2100.

The touch panel 2051 is mounted on the display surface side of the display 2002, and it is possible to see the display screen through the touch panel 2051. The touch panel 2051 specifies a touched position in relation to the X-Y coordinate of an image displayed on the display 2002, converts the position into a coordinate, and outputs the obtained coordinate. The touch panel 2051 comprises pressure-sensitive type or electrostatic type input detection elements or the like.

The dial switch 2052 is constructed so as to be rotatable clockwise and counterclockwise, generates a pulse signal for each rotation of a prescribed angle, and outputs the generated pulse signals to the processing part 2001. The processing part 2001 obtains the angle of rotation on the basis of the number of the pulse signals.

The ROM unit 2006 comprises a storage medium that is at least readable such as a Read-Only Memory (ROM) (such as a CD-ROM or a DVD-ROM) or an Integrated Circuit (IC) card. Such a storage medium stores moving image data or voice data, for example.

The vehicle speed sensor 2007, the gyro sensor 2008 and the GPS receiver 2009 are used for the navigation device 2100 to detect the current location (i.e. the location of the vehicle itself). The vehicle speed sensor 2007 is a sensor that outputs a value used for calculating the vehicle speed. The gyro sensor 2008 comprises an optical-fiber gyroscope, a vibrational gyroscope, or the like, and detects an angular velocity due to turning of a moving body. The GPS receiver 2009 receives signals from GPS satellites and measures a distance between a moving body and each GPS satellite and a rate of change of that distance with respect to three or more satellites, in order to measure the current location, the traveling speed and a traveling direction of the moving body.

The FM multiplex broadcast receiver 2010 receives an FM multiplex broadcast signal sent from an FM multiplex broadcast station. As FM multiplex broadcast, general current-state traffic information, traffic regulation information, Service Area/Parking Area (SA/PA) information, parking lot information, weather information and the like of Vehicle Information Communication System (VICS, a registered trademark) information, and text information provided as FM multiplex general information from a radio station can be received.

The beacon receiver 2011 receives general current-state traffic information, traffic regulation information, Service Area/Parking Area (SA/PA) information, parking lot information, weather information, emergency information and the like of, for example, VICS information. For example, an optical beacon receiver using light-wave communication and a radio beacon receiver using radio wave can be mentioned as the beacon receiver.

Figure 21:
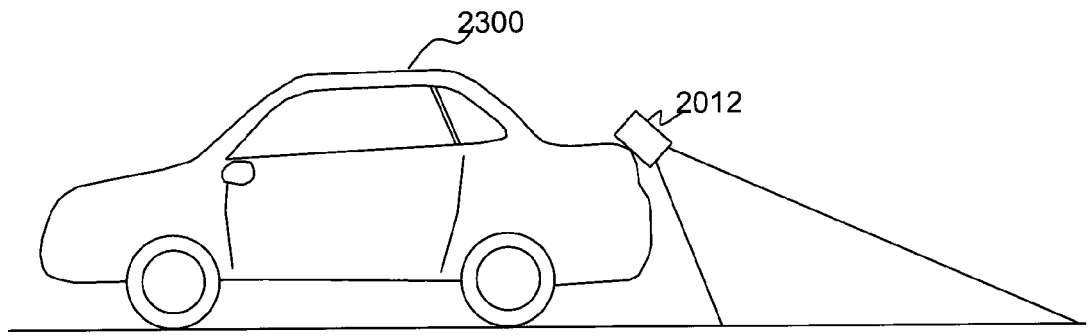
FIG. 21 is a view showing a mounting position of a camera.

FIG. 21 shows the camera 2012 attached on the back of a vehicle 2300. The camera 2012 is slanted downward in some degree to take an image of the ground surface posterior to the vehicle, by using an image pickup device such as a Charge Coupled Device (CCD) image sensor or a Complementary Metal Oxide Semiconductor (CMOS) image sensor. Further, there is no limit to the position at which the camera 2012 is attached. For example, the camera 2012 can be attached on the front part of the vehicle 2300 to take an image of the ground surface ahead of the vehicle.

Figure 22:
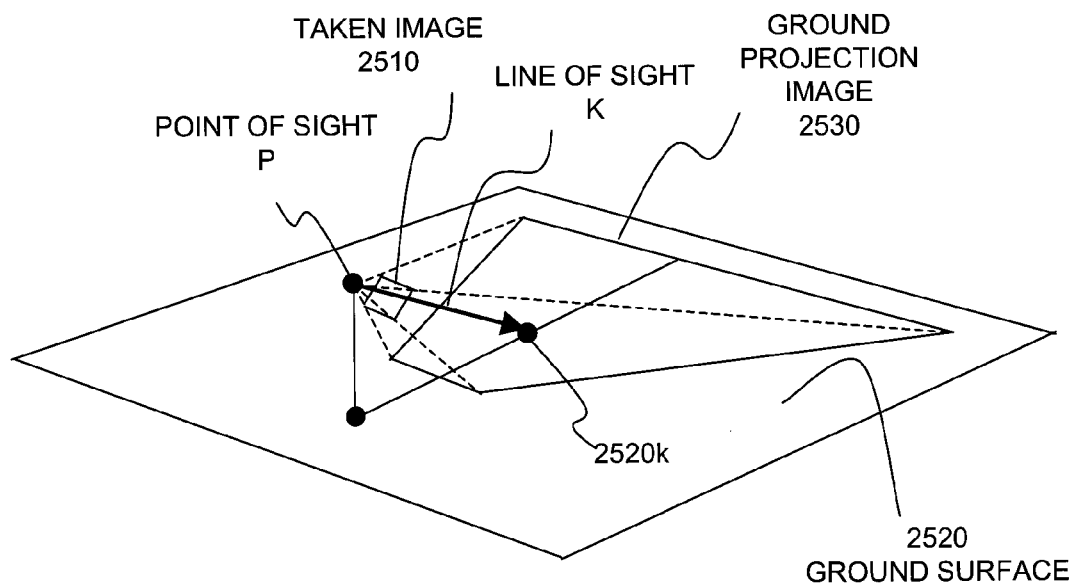
FIG. 22 is a view showing a state in which a taken image is projected on the ground surface.

FIG. 22 is a view for explaining a method of generating a ground projection image (i.e. an image obtained by projection on the ground) by using an image taken by the camera 2012 of FIG. 21. The below-mentioned camera control part 2104 obtains the position (a coordinate position in a 3D space with its origin at a prescribed position in the vehicle) of the point of sight P of the camera 2012 and the image-taking direction (the line of sight) K. Then, the camera control part 2104 generates a ground projection image 2530 by projecting the taken image 2510 on the ground surface 2520 in the image-taking direction K from the position of the point of sight P of the camera 2012. Here, the image-taking direction K intersects the taken image 2510 perpendicularly at its center. Further, the distance from the point of sight P of the camera 2012 to the taken image 2510 is determined previously. The thus-generated ground projection image 2530 is like a bird's-eye view of an area in the neighborhood of the vehicle seen from the sky over the vehicle.

The vehicle-mounted network communication unit 2013 connects the navigation device 2100 with a network (not shown) supporting a vehicle control network standard such as CAN or the like, and performs communication with an Electronic Control Unit (ECU) as another vehicle control unit connected with the network, by sending and receiving CAN messages to and from the ECU.

Figure 23:
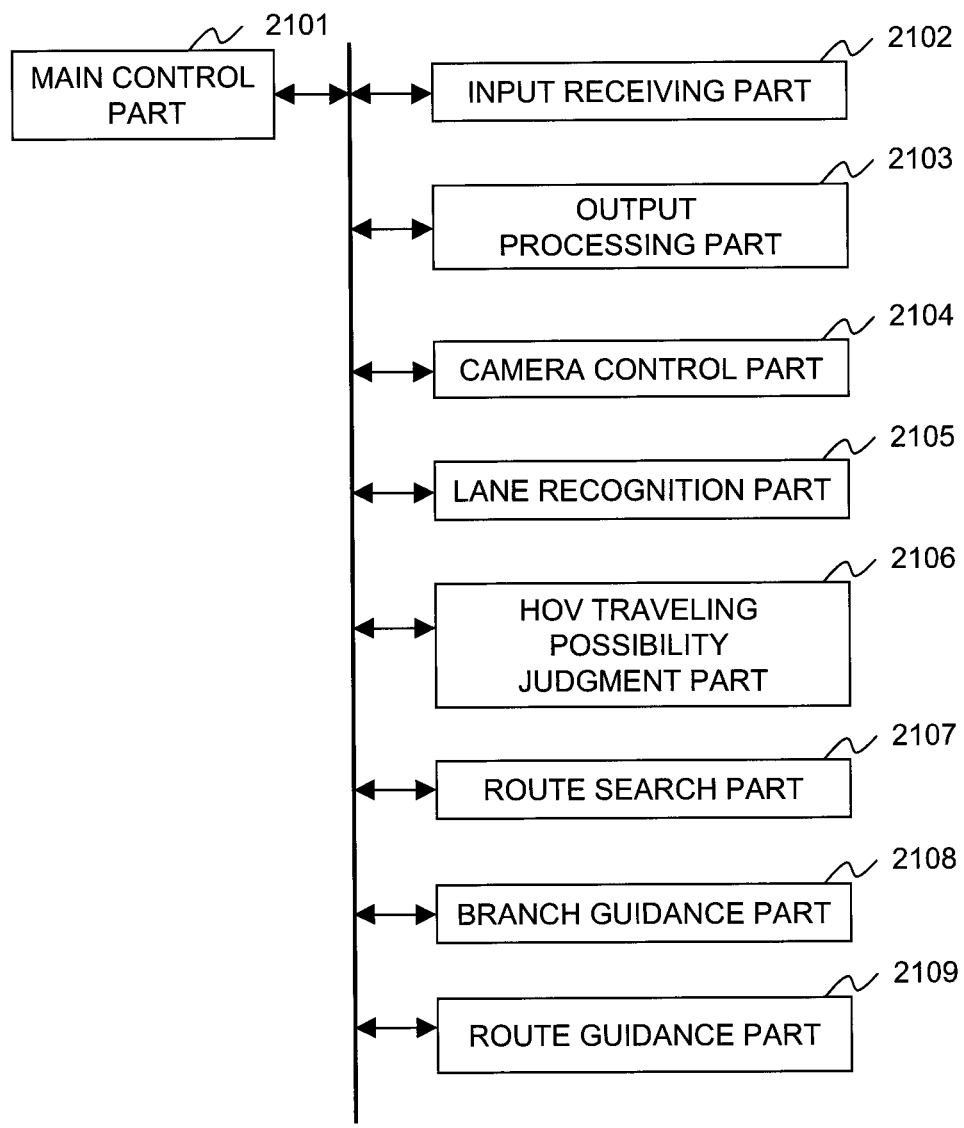
FIG. 23 is a functional block diagram showing a processing part.

FIG. 23 is a functional block diagram showing the processing part 2001. As shown in the figure, the processing part 2001 comprises a main control part 2101, an input receiving part 2102, an output processing part 2103, the camera control part 2104, a lane recognition part 2105, an HOV traveling possibility judgment part 2106, a route search part 2107, a branch guidance part 2108, and a route guidance part 2109.

The main control part 2101 is a central functional part that performs various types of processing. The main control part 2101 controls other processing parts depending on a content of processing. Further, the main control part 2101 obtains information from various sensors, the GPS receiver 2009 and the like, and performs map matching processing and the like to identify the current location. Further, at an appropriate time, the main control part 2101 associates the date and time of traveling with the location, to record in the storage unit 2003 a traveling history for each link. Further, in response to a request from each processing part, the main control part 2101 outputs the current time.

The input receiving part 2102 receives an instruction inputted from the user through the input unit 2005 or the microphone 2041, and controls each part of the processing part 2001 so that processing corresponding to the content of the request is performed. For example, in the case where the user requests a search for a recommended route, the input receiving part 2102 requests the output processing part 2103 to perform processing for displaying a map for setting a destination on the display 2002.

The output processing part 2103 receives screen information to display (such as polygon information, for example), converts the received information into a signal so that the information can be drawn on the display 2002, and instructs the display 2002 to perform drawing.

The camera control part 2104 controls operation of the camera 2012. For example, the camera control part 2104 sets timing of start and end of taking an image by the camera 2012.

Further, the camera control part 2104 controls sending of the taken image to the lane recognition part 2105.

The lane recognition part 2105 obtains an image (as image data) taken by the camera 2012, and converts the obtained image to an image for displaying (a ground projection image). Further, from the obtained image, the lane recognition part 2105 recognizes marks and the like laid or colored on the road surface, to identify the lane in which the vehicle is traveling. For example, as described later, when the lane recognition part 2105 recognizes existence of, for example, a mark (a diamond painting) indicating an HOV lane nearly at the center in the width direction of the image, then the lane recognition part 2105 judges that the vehicle 2300 is traveling in an HOV lane. Or, when the lane recognition part 2105 recognizes the mark not nearly at the center in the width direction of the image but in a position closer to the right or left side and additionally the mark is on the edge side of the image beyond a lane mark seen from the vicinity of the center, then the lane recognition part 2105 judges that the vehicle is traveling not in an HOV lane but in the lane adjacent to an HOV lane.

The HOV traveling possibility judgment part 2106 judges whether the vehicle 2300 is allowed to travel in an HOV lane or not. In judging the traveling possibility, the HOV traveling possibility judgment part 2106 makes judgment, through the vehicle-mounted network communication unit 2013, on the type and the like of the vehicle 2300 on the basis of communication information flowing through the vehicle-mounted network of the vehicle 2300, and determines whether the vehicle is of the type that is allowed to travel in the HOV lane. Of course, the judgment of traveling possibility is not limited to this. For example, the HOV traveling possibility judgment part 2106 may specify the number of passengers by means of a load sensor (not shown) attached on each seat of the vehicle or by means of seat belt wearing sensors, to judge whether the number of passengers reaches the required number for traveling in an HOV lane.

The route search part 2107 searches for the optimum route (recommended route) that connects the departure place designated by the user or the current location to the destination. In performing the route search, route search logic such as the Dijkstra's algorithm is employed to search for a route on the basis of a link cost previously set to each specific section (i.e. link) of roads. In this processing, the route search part 2107 requests the HOV traveling possibility judgment part 2106 to judge whether the vehicle is in a condition possible for traveling in an HOV lane. If the vehicle is in a condition possible for traveling in an HOV lane, the search for a recommended route is performed by giving priority to a route using an HOV lane. If the vehicle is not in a condition possible for traveling in an HOV lane, the route search part 2107 searches for a route for which the link cost is least, without considering an HOV lane. In this processing, if the vehicle is already traveling in an HOV lane although it is judged that the vehicle is not in a condition possible for traveling in the HOV lane, the route search part 2107 searches for a recommended route by giving priority to a route using the HOV lane. In judging whether the vehicle is already traveling in an HOV lane or not, the route search part 2107 refers to the HOV attribute 2228 of the link to which the current location belongs. If the HOV attribute 2228 is "exclusive", the route search part 2107 judges that the vehicle is traveling in an HOV lane. If the HOV attribute 2228 is "none", the route search part 1107 judges that the vehicle is not traveling in an HOV lane. And, if the HOV attribute 2228 is "shared", the route search part 2107 makes the judgment by requesting the lane recognition part 2105 to judge whether the traveling lane is an HOV lane or not.

The branch guidance part 2108 guides the user about existence and location of a merging point with another road, a branch to another road or the like, by using image or voice. For example, before a merging location of a branch line with a main line of, for example, an expressway, the branch guidance part 2108 outputs a display informing the user that the merging point is coming closer or informing the user of the approximate distance to the merging point, to the display 2002 through the output processing part 2103. Further, for example at a branch point from a main line to a ramp of an expressway, the branch guidance part 2108 informs the user which lane the vehicle should travel in, by voice through the speaker 2042.

When the vehicle 2300 is traveling in an ordinary lane, the branch guidance part 2108 guides the user about existence and location of a branch or the like as described above. And when the vehicle 2300 is traveling an HOV lane, the branch guidance part 2109 restricts the branch guidance.

The route guidance part 2109 guides the user in his driving operation, by using the speaker 2042 and/or the display 2002 so that the current location of the vehicle does not deviate from the recommended route. Further, the route guidance part 2109 guides the user to an entrance to an HOV lane or to an exit to an ordinary lane.

The above-described functional parts of the processing part 2001, namely, the main control part 2101, the input receiving part 2102, the output processing part 2103, the camera control part 2104, the lane recognition part 2105, the HOV traveling possibility judgment part 2106, the route search part 2107, the branch guidance part 2108, and the route guidance part 2109, are each realized when the CPU 2021 reads and executes a prescribed program. To that end, the RAM 2022 stores the program for realizing processing of each functional part.

The above-described components are results of component classification of the navigation device 2100 according to main contents of processing, in order to make it easy to understand the configuration of the navigation device 2100. Thus, the way of classification of components and their names do not restrict the present invention. The components of the navigation device 2100 can be classified into a larger number of components according to contents of processing. Or, it is possible to classify components such that each component performs more contents of processing.

Further, each functional part may be realized by hardware (such as ASIC or GPU). Further, processing of each functional part may be performed by one hardware unit or by a plurality of hardware units.

[Description of Operation]

Figure 24:
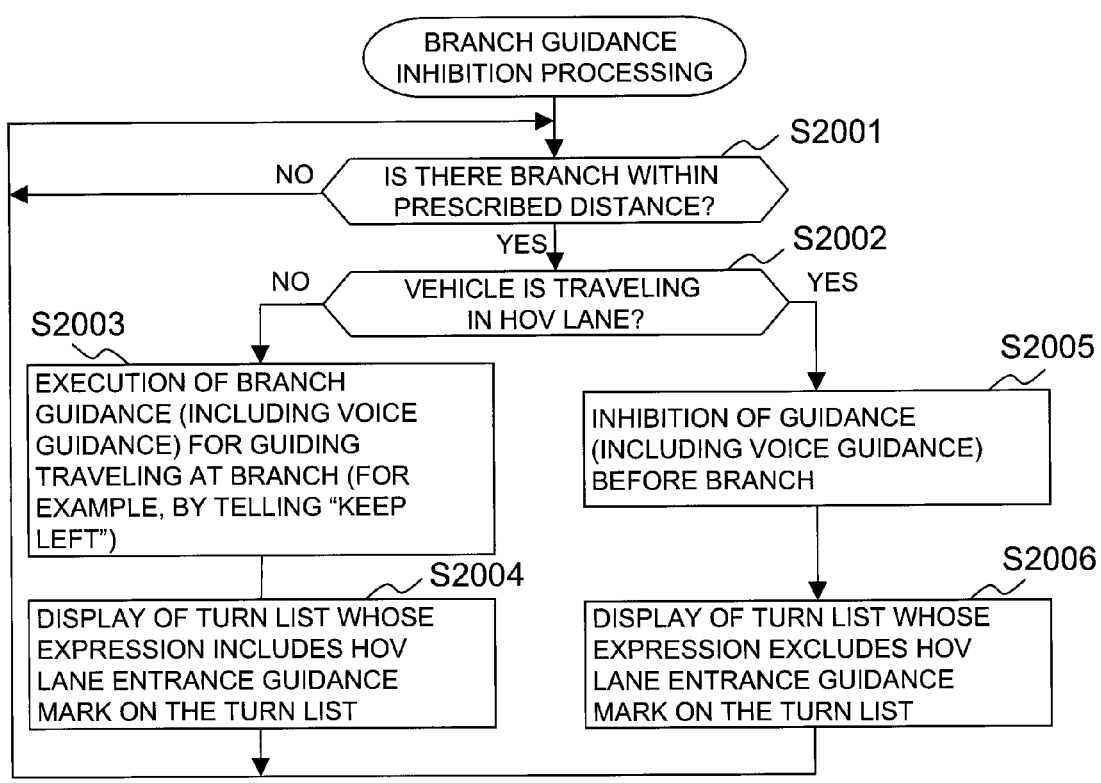
FIG. 24 is a flowchart showing branch guidance inhibition processing.

Next, operation of branch guidance inhibition processing performed by the navigation device 2100 will be described. FIG. 24 is a flowchart showing the branch guidance inhibition processing performed by the navigation device 2100. This flow is started when the navigation device 2100 is powered on to be activated.

First, the branch guidance part 2108 judges whether there is a branch point within a prescribed distance (Step S2001). In detail, the branch guidance part 2108 inquires of the main control part 2101 whether there is a branch point (where the road branches away from the traveling direction) within a prescribed distance from the current location. In the processing of searching for a branch point within the prescribed distance from the current location, the main control part 2101 searches for a branch point within the prescribed distance on the recommended route if the recommended route has been set. If the recommended route has not been set, the main control part 2101 searches for a branch point within the prescribed distance in the traveling direction on the currently-traveling road. Then, on the basis of the result of the inquiry, the branch guidance part 2108 judges whether there is a branch point or not.

If there is not a branch point within the prescribed distance ("No" in Step S2001), the branch guidance part 2108 returns the processing to Step S2001.

If there is a branch point within the prescribed distance ("Yes" in Step S2001), the branch guidance part 2108 judges whether the vehicle is traveling in an HOV lane (Step S2002). In detail, the branch guidance part 2108 obtains the HOV attribute 2228 of the lane in which the vehicle is traveling, to judge whether the vehicle is traveling in an HOV lane.

In detail, if the HOV attribute of the lane is "exclusive", the branch guidance part 2108 judges that the vehicle is traveling in an HOV lane. If the HOV attribute of the lane is "none", the branch guidance part 2108 judges that the vehicle is not traveling in an HOV lane. If the HOV attribute of the lane is "shared", the lane recognition part 2105 uses an image taken by the camera 2012 to judge whether the vehicle is traveling in an HOV lane.

If it is judged by using an image taken by the camera 2012 that the vehicle is traveling in an HOV lane, the branch guidance part 2108 proceeds with the processing to Step S2005 described below.

If it is judged by using an image taken by the camera 2012 that the vehicle is not traveling in an HOV lane, the branch guidance part 2108 proceeds with the processing to Step S2003 described below.

If it is judged that the vehicle is not traveling in an HOV lane ("No" in Step S2002), the branch guidance part 2108 performs branch guidance to guide the user about branching (Step S2003). In detail, at the branch point specified by Step S2001, the branch guidance part 2108 guides the user about the direction in which he should proceed, by giving a voice message and by displaying a message display on the display 2002.

Then, the branch guidance part 2108 displays a turn list that includes an HOV lane entrance guidance mark in its expression (Step S2004). In detail, the branch guidance part 2108 displays a turn list that shows, as a checkpoint figure, an intersection included in the recommended route or an intersection existing ahead in the vehicle's traveling direction. Superimposed on the checkpoint figure included in the list, are displayed a traveling direction figure indicating the traveling direction at the checkpoint and an HOV lane figure (a diamond mark imitating an HOV lane mark) for guiding the user about an entrance to an HOV lane. The branch guidance part 2108 displays the turn list on the display 2002 through the output processing part 2103. By displaying this, the user can grasp information on an intersection at which he should turn to the right or left on the recommended route, by means of a checkpoint figure. That is to say, when the user sees HOV lane figures superimposed on checkpoint figures arranged in order of occurrence in the traveling direction, the user can quickly grasp at which checkpoint he should enter an HOV lane. Then, the branch guidance part 2108 returns the processing to Step S2001.

If it is judged that the vehicle is traveling in an HOV lane ("Yes" in Step S2002), the branch guidance part 2108 restricts the branch guidance for guiding the user about branch (Step S2005). In detail, at the branch point specified in Step S2001, the branch guidance part 2108 avoids giving unnecessary information to the user, by preventing the voice message and by preventing the message display from being displayed on the display 2002.

Then, the branch guidance part 2108 displays a turn list that does not include the HOV lane entrance guidance mark (Step S2006). In detail, the branch guidance part 2108 displays a turn list that shows, as a checkpoint figure, an intersection included in the recommended route or an intersection existing ahead in the vehicle's traveling direction. Superimposed on the checkpoint figure included in the turn list, is displayed a traveling direction figure indicating the traveling direction at the checkpoint. The branch guidance part 2108 displays the turn list on the display 2002 through the output processing part 2103. By displaying this, the user can grasp information on an intersection at which he should turn to the right or left on the recommended route, by means of a checkpoint figure. In addition, it is possible to inhibit displaying of HOV lane entrance information that becomes unnecessary since the vehicle is already traveling in the HOV lane. Then, the branch guidance part 2108 returns the processing to Step S2001.

Figure 25A:
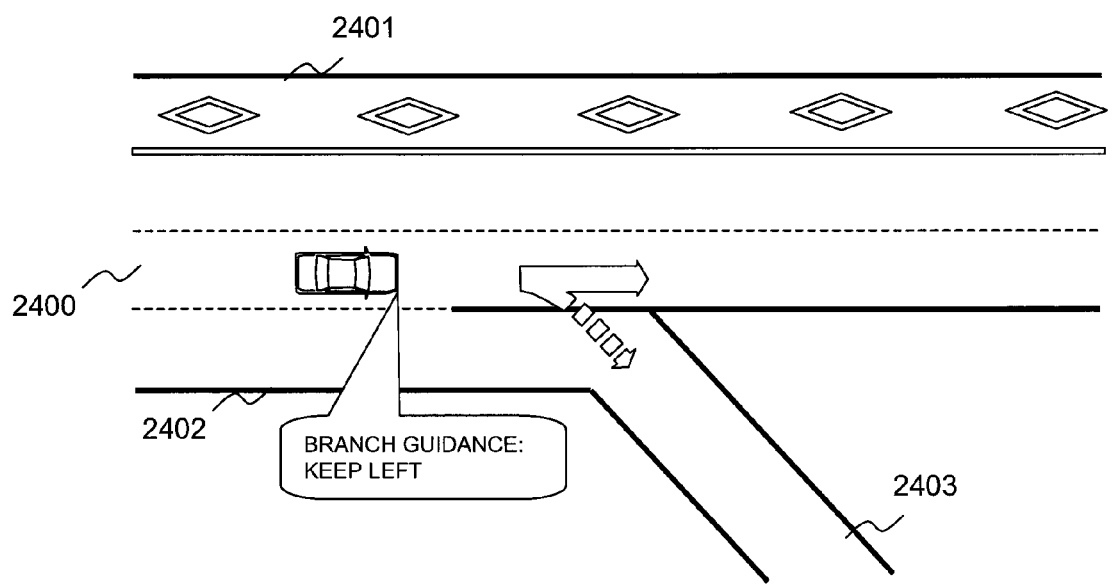
FIGS. 25A and 25B are views illustrating a specific example of the branch guidance inhibition processing.
Figure 25B:
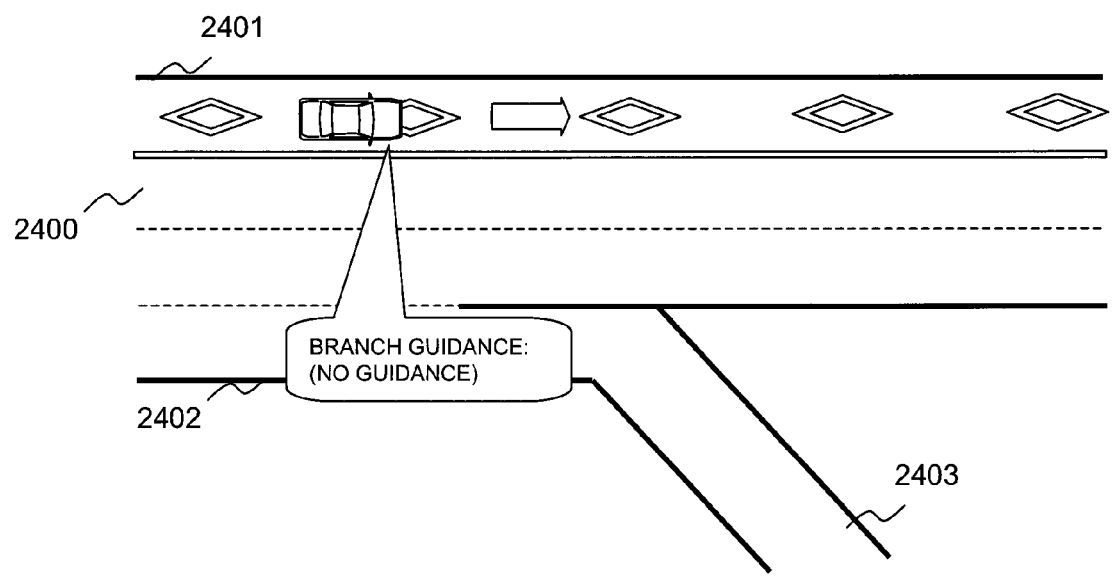

FIGS. 25A and 25B are views showing an example of traveling of a vehicle along a road 2400 that is shared by an HOV lane 2401 and one or more ordinary lanes 2402. It is assumed that the road 2400 has a branch road 2403, and it is impossible to enter directly into the branch road 2403 from the HOV lane 2401. However, it may be allowed that once a vehicle exits from the HOV lane 2401 to the ordinary lane 2402 and then enters into the branch road 2403. Further, in FIG. 25A, it is assumed that a vehicle equipped with the navigation device 2100 is traveling in the ordinary lane 2402 in a straight line, i.e. along a route that does not lead to the branch road 2403. Further, in FIG. 25B, it is assumed that a vehicle equipped with the navigation device 2100 is traveling in the HOV lane 2401 in a straight line, i.e. along a route that does not lead to the branch road 2403.

In the situation of FIG. 25A, to keep the vehicle from entering into the branch road 2403, the branch guidance part 2108 performs guidance at a location within a prescribed distance before the branch point, by giving a message such as "Keep left (Run the left lane)" to keep traveling in a straight line, i.e. traveling in the left lane. Such guidance is needed since traveling in the right lane may incorrectly cause entry into the branch road 2403. In this case, since it is judged that the vehicle is traveling in the ordinary lane, the navigation device 2100 does not inhibit the branch guidance by the branch guidance part 2108.

In the situation of FIG. 25B, the vehicle is traveling in the HOV lane 2401, and thus it is not necessary for the branch guidance part 2108 to gives guidance, at a location within a prescribed distance before the branch point, for traveling in a straight line, i.e. keeping the left lane. In this case, since it is judged that the vehicle is traveling in the HOV lane, the navigation device 2100 inhibits the branch guidance by the branch guidance part 2108. In FIG. 25B, since the branch guidance is inhibited, the user can travel in the HOV lane 2401 without being disturbed by unnecessary guidance.

Hereinabove, the content of the branch guidance inhibition processing has been described. By performing the branch guidance inhibition processing, the navigation device 2100 can avoid giving unnecessary branch guidance to the user in the course of traveling an HOV lane.

The above-described processing assumes traveling in an HOV lane of an ordinary road, but the invention is not limited to this. For example, the branch guidance may be inhibited suitably also in a route including an expressway. That is to say, in the case where there is entry into or exit from an expressway or the like or merging into a junction, it is possible to arrange that merging guidance is inhibited in the course of traveling in an HOV lane. By doing so, it is possible to prevent occurrence of user's distraction due to unnecessary guidance given during high-speed traveling.

Hereinabove, an embodiment of the third point of the invention has been described. According to this embodiment of the third point of the invention, the navigation device 2100 can inhibit branch guidance unnecessary to a user traveling in an HOV lane along a recommended route.

The present invention is not limited to the above-described embodiment of the third point of the invention. The above-described embodiment of the third point of the invention can be varied variously within the spirit and scope of the present invention. For example, as for the lane recognition processing by the lane recognition part 2105, the lane recognition may be performed on the basis of high-precision location information of GPS or information received from oscillators laid on each lane for lane recognition.

Further, in the above embodiment, the branch guidance is inhibited in the course of traveling in an HOV lane. Without being limited to this, it is possible to arrange that the branch guidance is inhibited in the course of traveling in an ordinary lane, and the branch guidance is performed in the course of traveling in an HOV lane.

Hereinabove, the present invention has been described centering on embodiments of the first, second and third points of the invention. In the above embodiments, examples of applying the invention to a navigation device have been described. However, the present invention is not limited to a navigation device, and can be generally applied to a device that performs route guidance for a moving body.

The above embodiments have been described taking examples in the United States where the right-hand traffic is the standard. Of course, the right and left sides can be reversed with respect to U.K., Japan and the like where the left-hand traffic is the standard.

The invention claimed is:

1. A navigation device comprising:
a storage unit in which lane information is stored, including information on a state of setting-up of a conditional lane that is available for traveling when prescribed conditions are satisfied; and
a processor programmed to perform guidance along a recommended route to a destination;
wherein the processor performs guidance, in an entrance/exit possible section of the recommended route where both entrance and exit are possible between ordinary lanes and conditional lanes of a road on the recommended route, for an entrance to the conditional lanes from the ordinary lanes or an exit from the conditional lanes to the ordinary lanes of the road;
wherein, although the processor normally provides a notification to a user that an entrance to a conditional lane on the recommended route exits, the processor prevents the notification of existence of the entrance to the conditional lane on the recommended route when the processor determines that the recommended route does not include an entrance/exit possible section between the entrance of the conditional lane and an exit from the road to a branch road on the recommended route; and
wherein the processor re-searches for a route for traveling through the nearest exit link of the conditional lane when the processor determines that the recommended route does not include the entrance/exit possible section between the entrance of the conditional lane and the exit from the road to the branch road on the recommended route, and performs guidance not to enter into the conditional lane through an entrance of the conditional lane if a cost of the re-searched route is not advantageous.

2. A navigation device according to claim 1, wherein:
when traveling in the conditional lane, the processor performs guidance to exit from the conditional lane through a nearest exit link of the conditional lane when the processor determines that the recommended route does not include the entrance/exit possible section between the entrance of the conditional lane and the exit from the road to the branch road on the recommended route.

3. A navigation device comprising:
a storage unit in which lane information is stored, including information on a state of setting-up of a conditional lane that is available for traveling when prescribed conditions are satisfied; and
a processor programmed to perform guidance along a recommended route to a destination;
wherein the processor performs guidance, in an entrance/exit possible section of the recommended route where both entrance and exit are possible between ordinary lanes and conditional lanes of a road on the recommended route, for an entrance to the conditional lanes from the ordinary lanes or an exit from the conditional lanes to the ordinary lanes of the road;
wherein, although the processor normally provides a notification to a user that an entrance to a conditional lane on the recommended route exits, the processor prevents the notification of existence of the entrance to the conditional lane on the recommended route when the processor determines that the recommended route does not include an entrance/exit possible section between the entrance of the conditional lane and an exit from the road to a branch road on the recommended route; and
wherein the processor performs guidance to exit from the conditional lane at a most distant exit link of the conditional lane between the entrance of the conditional lane and the exit from the road to the branch road on the recommended route when the processor determines that the recommended route includes one or more entrance/exit possible sections between the entrance of the conditional lane and the exit from the road to the branch road on the recommended route.

4. A guidance method of a navigation device, comprising:
storing, in a storage unit, lane information including information on a state of setting-up a conditional lane that is available for traveling when prescribed conditions are satisfied;
performing guidance, by a processor, along a recommended route to a destination; and
performing guidance, by the processor, for an entrance/exit possible section of the recommended route where both entrance and exit are possible between ordinary lanes and the conditional lane of a road on the recommended route, for an entrance to the conditional lane from the ordinary lanes or an exit from the conditional lane to the ordinary lanes of the road; and
wherein, although the processor normally provides a notification to a user that an entrance to the conditional lane on the recommended route exits, the processor prevents the notification of existence of the entrance to the conditional lane on the recommended route when the processor determines that the recommended route does not include an entrance/exit possible section between the entrance of the conditional lane and an exit from the road to a branch road on the recommended route; and
wherein the processor re-searches for a route for traveling through a nearest exit link of the conditional lane when the processor determines that the recommended route does not include the entrance/exit possible section between the entrance of the conditional lane and the exit from the road to the branch road on the recommended route, and performs guidance not to enter into the conditional lane through an entrance of the conditional lane if a cost of the re-searched route is not advantageous.

5. A guidance method of a navigation device, comprising:

storing, in a storage unit, lane information including information on a state of setting-up a conditional lane that is available for traveling when prescribed conditions are satisfied;

performing guidance, by processor, along a recommended route to a destination; and performing guidance, by the processor, for an entrance/exit possible section of the recommended route where both entrance and exit are possible between ordinary lanes and the conditional lane of a road on the recommended route, for an entrance to the conditional lane from the ordinary lanes or an exit from the conditional lane to the ordinary lanes of the road; and wherein, although the processor normally provides a notification to a user that an entrance to the conditional lane on the recommended route exits, the processor prevents the notification of existence of the entrance to the conditional lane on the recommended route when the processor determines that the recommended route does not include an entrance/exit possible section between the entrance of the conditional lane and an exit from the road to a branch road on the recommended route; and wherein the processor performs guidance to exit from the conditional lane at a most distant exit link of the conditional lane between the entrance of the conditional lane and the exit from the road to the branch road on the recommended route when the processor determines that the recommended route includes one or more entrance/exit possible sections between the entrance of the conditional lane and the exit from the road to the branch road on the recommended route.

* * * * *